US006594728B1

(12) United States Patent
Yeager

(10) Patent No.: US 6,594,728 B1
(45) Date of Patent: Jul. 15, 2003

(54) CACHE MEMORY WITH DUAL-WAY ARRAYS AND MULTIPLEXED PARALLEL OUTPUT

(75) Inventor: Kenneth C. Yeager, Sunnyvale, CA (US)

(73) Assignee: MIPS Technologies, Inc., Mountain View, CA (US)

( * ) Notice: Subject to any disclaimer, the term of this patent is extended or adjusted under 35 U.S.C. 154(b) by 0 days.

(21) Appl. No.: 08/813,500

(22) Filed: Mar. 7, 1997

Related U.S. Application Data

(63) Continuation of application No. 08/324,124, filed on Oct. 14, 1994, now abandoned.

(51) Int. Cl.[7] .............................................. G06F 12/08
(52) U.S. Cl. ...................... 711/127; 711/120; 711/128
(58) Field of Search ................................ 395/164, 430, 395/454, 455, 484, 250, 447, 415; 365/189.01, 189.02, 230.02, 230.04; 364/DIG. 1; 711/127, 128, 120

(56) References Cited

U.S. PATENT DOCUMENTS

| | | | | |
|---|---|---|---|---|
| 3,967,247 A | | 6/1976 | Andersen et al. ...... 364/222.81 |
| 4,381,541 A | | 4/1983 | Baumann, Jr. et al. ..... 711/128 |
| 4,616,310 A | * | 10/1986 | Dill et al. .................... 395/250 |
| 4,736,293 A | * | 4/1988 | Patrick ....................... 711/128 |
| 4,953,073 A | | 8/1990 | Moussouris et al. |
| 5,027,270 A | | 6/1991 | Riordan et al. |
| 5,063,533 A | * | 11/1991 | Erhart et al. ................. 711/157 |
| 5,113,506 A | | 5/1992 | Moussouris et al. |
| 5,212,780 A | * | 5/1993 | Padgaonkar et al. ... 365/230.04 |
| 5,253,203 A | * | 10/1993 | Partovi et al. ......... 365/189.02 |
| 5,289,584 A | * | 2/1994 | Thome et al. .............. 711/109 |
| 5,307,477 A | | 4/1994 | Taylor et al. |
| 5,386,533 A | * | 1/1995 | Morris ....................... 711/103 |
| 5,442,748 A | * | 8/1995 | Chang et al. ............... 395/164 |
| 5,479,630 A | | 12/1995 | Killian |
| 5,510,934 A | | 4/1996 | Brennan et al. |
| 5,542,062 A | | 7/1996 | Taylor et al. |
| 5,568,442 A | | 10/1996 | Kowalczyk et al. |
| 5,572,704 A | | 11/1996 | Bratt et al. |
| 5,604,909 A | | 2/1997 | Joshi et al. |
| 5,632,025 A | | 5/1997 | Bratt et al. |
| 5,699,551 A | | 12/1997 | Taylor et al. |
| 5,740,402 A | | 4/1998 | Bratt et al. |
| 5,805,855 A | * | 9/1998 | Liu ............................ 711/108 |
| 5,870,574 A | | 2/1999 | Kowalczyk et al. |
| 5,946,710 A | * | 8/1999 | Bauman et al. ............. 711/129 |
| 5,954,815 A | | 9/1999 | Joshi et al. |

FOREIGN PATENT DOCUMENTS

| | | |
|---|---|---|
| EP | 0564813 | 10/1993 |
| WO | WO 85/04737 | 10/1985 |

OTHER PUBLICATIONS

J. Cocke et al., The Evolution of RISC Technology at IBM, pp. 4–36, IBM J. Res Develop., vol. 34, No. 1 (Jan. 1990).
Copy of European Search Report from European Patent Application No. 95938247.4 (Note Citation above).

* cited by examiner

Primary Examiner—B. James Peikari
Assistant Examiner—J. Peikari

(57) ABSTRACT

A two-way cache memory having multiplexed outputs and alternating ways is disclosed. Multiplexed outputs enable the cache memory to be more densely packed and implemented with fewer sense amplifiers. Alternating ways enable two distinct cache access patterns. According to a first access pattern, two doublewords in the same way may be accessed simultaneously. Such access facilities the leading of data into main memory. According to a second access pattern, two doublewords in the same location but in different ways may be accessed simultaneously. Such access facilitates the loading a particular word into a register file.

17 Claims, 13 Drawing Sheets

Microfiche Appendix Included
(1 Microfiche, 48 Pages)

CACHE MEMORY WITH DUAL-WAY ARRAYS AND MULTIPLEXED PARALLEL OUTPUT

This is a continuation of application No. 08/324,124 filed Oct. 14, 1994, now abandoned.

A preferred embodiment of the present invention is incorporated in a supercalar processor identified as "R10000," which was developed by Silicon Graphics, Inc., of Mountain View, California. Various aspects of the R10000 are U.S. Ser. Nos. 08/324,128, 08/324,129 and 08/324,127, all incorporated herein by reference for all purposes. The R10000 is also described is J. Heinrich, MIPS R10000 Microprocessor User's Manual, MIPS Technologies, Inc. (1994).

MICROFICHE APPENDIX

A microfiche appendix containing one sheet and forty-eight frames is included as Appendices I and II to this application and is hereby incorpated by reference in its entirety for all purposes. The microfiche appendix is directed to Chapters 16 and 17 of the design notes describing the R10000 processor.

BACKGROUND OF THE INVENTION

This invention relates in general to computers and in particular, to cache memory.

CPU designers, since the inception of computers, have been driven to design faster and better processors in a cost-effective manner. For example, as faster versions of a particular CPU becomes available, designers will often increase the CPU's clock frequency as a simple and cost effective means of improving the CPU's throughput.

After a certain point, the speed of the system's main memory (input/output) becomes a limiting factor as to how fast the CPU can operate. When the CPU's operating speed exceeds the main memory's operating requirements, the CPU must issue one or more wait states to allow memory to catch up. Wait states, however, have a deleterious effect on CPU's performance. In some instances, one wait state can decrease the CPU's performance by about 20–30%

Although wait states can be eliminated by employing faster memory, it is very expensive and may be impractical. Typically, the difference between the price of a fast memory chip and the next fastest speed grade can range from 50–100%.

Thus, the cost can be quite prohibitive, especially for a system requiring a large memory.

A cost effective solution has been to provide the CPU with a hierarchical memory consisting of multiple levels of memory with different speeds and sizes. Since the fastest memories are more expensive per bit than slower memories, they are usually smaller in size. This smaller memory, referred to as a "cache", is closely located to the microprocessor or even integrated into the same chip as the microprocessor.

Conceptually, the memory controller retrieves instructions and data that are currently used by the processor and stores them into the cache. When a processor fetches instructions or data, it first checks the cache. The control logic determines if the required information is stored in the cache (cache hit). If a cache hit occurs, the CPU does not need to access to main memory. The control logic uses valuable cycles to determine if the requested data is in the cache. However, this cost is acceptable since accesses to main memory is much slower.

As can been seen, the higher the cache "hit" rate is, the faster the CPU can perform its duties. obviously, the larger the cache, the more data it can store, and thus, a higher probability of a hit. However, in the real world, microprocessor designers are always faced with size constraints due to the fact that as there is limited available space on a die. Using a larger die size, although effective, is not practical since the cost increases as die size increases. Further, reducing the size of the cache without reducing the performance allows the designer to improve the performance of other functional units of the CPU.

Thus, there is a need for designing a cache that can determine if a hit has occurred using a minimum number of cycles and a high hit rate while reducing space needed on the chip.

SUMMARY OF THE INVENTION

The present invention offers a highly efficient mechanism for implementing cache memory in a computer system. This mechanism enables the cache memory to have high a "hit" rate, fast access time, low latency, and reduced physical size.

In one embodiment, the present invention provides a cache which operates in parallel with the translation lookaside buffer to reduce its latency. The cache contains two 2-way set-associative arrays that are interleaved together. Each 2-way set-associative array includes two arrays, one each for the tag and data. By having four independently operating cache arrays, up to four instructions can operate simultaneously. The bits in each data array are interleaved to allow two distinct access patterns. For example, when the cache is loaded or copied back, two double words in the same block are accessed simultaneously. When the cache is read, the same doubleword location is simultaneously read from both blocks with the set. Further, by using a multiplexer, the number of sense amplifiers for reading and writing are reduced, thereby saving significantly valuable space on the die.

A better understanding of the nature and advantages of the present invention may be had with reference to the detailed description and the drawings below.

DESCRIPTION OF THE PREFERRED EMBODIMENT

Contents

I. Superscalar Processor Architecture
  A. Superscalar Processor Overview
  B. Operation
II. Load/Store Unit
  A. Load/Store Unit Overview
III. Data Cache
  A. Data Cache Overview
  B. Data Array
    1. Data Array Organization
    2. Data Array Control Logic
  C. Tag Array
    1. Tag Array Organization
    2. Tag Array Control Logic
  D. Cache Interface I. Superscalar Processor Architecture FIG. 1 discloses a functional block diagram of a superscalar processor 100 which incorporates a cache memory in accordance with the present invention. Processor 100, which generally represents the R10000 Superscalar Processor developed by Silicon Graphics, Inc., of Mountain View, Calif., provides only one example of an application for the cache memory of the present invention.

A. Superscalar Processor Overview

A superscalar processor can fetch and execute more than one instruction in parallel. Processor 100 fetches and decodes four instructions per cycle. Each decoded instruction is appended to one of three instruction queues. These queues can issue one new instruction per cycle to each of five execution pipelines.

Figure 1:
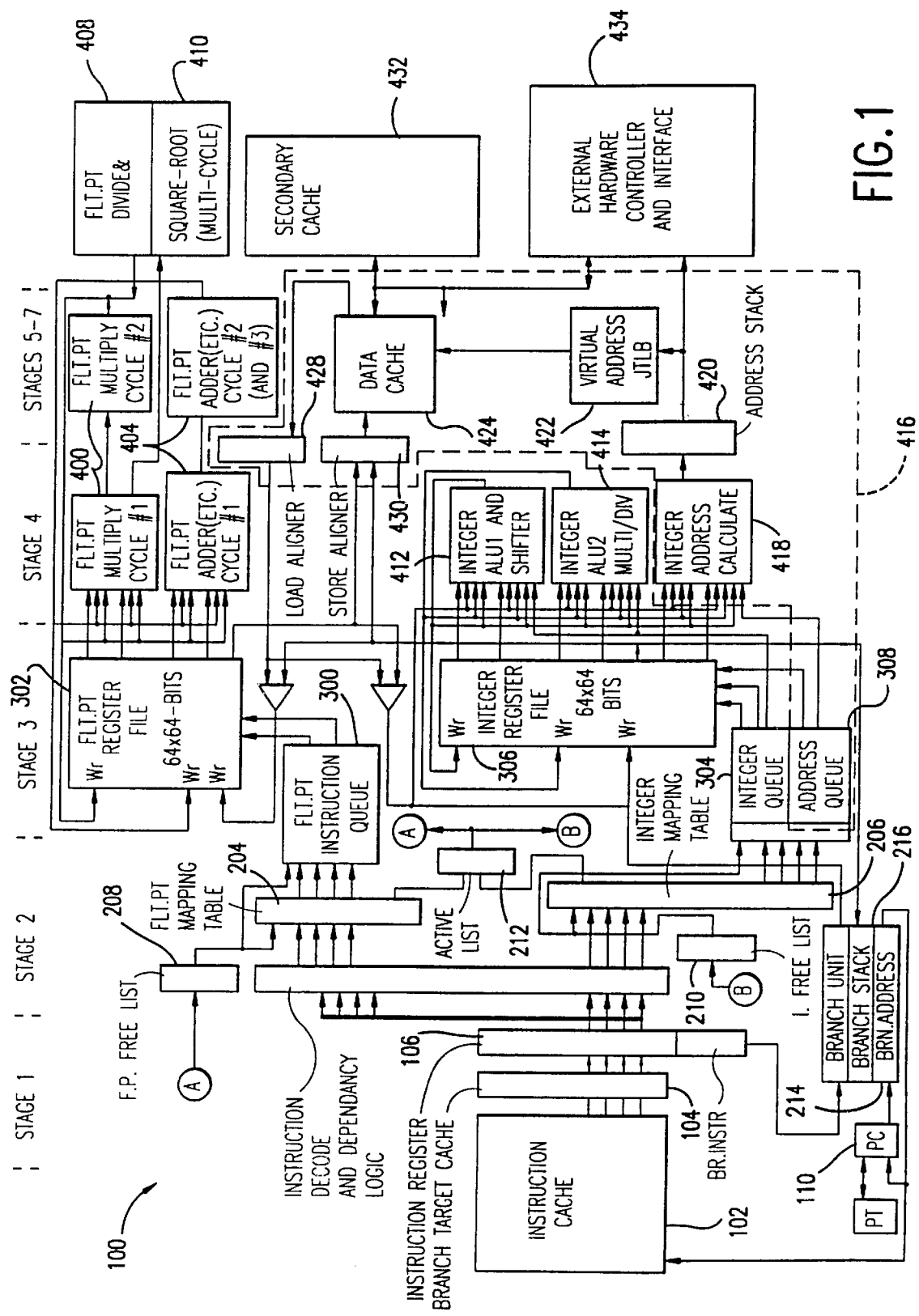
FIG. 1 discloses a functional block diagram of a superscalar processor.

The block diagram of FIG. 1 is arranged to show the stages of an instruction pipeline and illustrates functional interconnectivity between various processor elements. Generally, instruction fetch and decode are carried out in stages 1 and 2; instructions are issued from various queues in stage 3; and instruction execution is performed in stages 4–7.

Referring to FIG. 1, a primary instruction cache 102 reads four consecutive instructions per cycle, beginning on any word boundary within a cache block. A branch target cache 104, instruction register 106, instruction decode, and dependency logic 200, convey portions of issued instructions to floating point mapping table 204 (32 word by 6 bit RAM) or integer mapping table 206 (33 word by 6 bit RAM). These tables carry out a "register renaming" operation, described in detail below, which renames logical registers identified in an instruction with a physical register location for holding values during instruction execution. A redundant mapping mechanism is built into these tables to facilitate efficient recovery from branch mispredictions. Mapping tables 204 and 206 also receive input from a floating point free list 208 (32 word by 6 bit RAM) and an integer free list 210 (32 word by 6 bit RAM), respectively. Output of both mapping tables is fed to active list 212 which, in turn, feeds the inputs of free lists 208 and 210.

A branch unit 214 also receives information from instruction register 106, as shown in FIG. 1. This unit processes no more than one branch per cycle. The branch unit includes a branch stack 216 which contains one entry for each conditional branch. Processor 100 can execute a conditional branch speculatively by predicting the most likely path and decoding instructions along that path.

The prediction is verified when the condition becomes known. If the correct path is taken, processing continues along that path. Otherwise, the decision must be reversed, all speculatively decoded instructions must be aborted, and the program counter and mapping hardware must be restored.

Referring again to FIG. 1, mapping tables 204 and 206 support three general pipelines, which incorporate five execution units. A floating-point pipeline is coupled to floating-point mapping table 204. The floating-point pipeline includes a sixteen-entry instruction queue 300 which communicates with a sixty-four-location floating point register file 302. Register file 302 and instruction queue 300 feed parallel multiply unit 400 and adder 404 (which performs, among other things, comparison operations to confirm floating-point branch predictions). Multiply unit 400 also provides input to a divide unit 408 and square root unit 410.

Second, an integer pipeline is coupled to integer mapping table 206. The integer pipeline includes a sixteen-entry integer instruction queue 304 which communicates with a sixty-four-location integer register file 306. Register file 306 and instruction queue 304 feed arithmetic logic units ("ALU") ALU#1 412 (which contains an ALU, shifter and integer branch comparator) and ALU#2 414 (which contains an ALU, integer multiplier and divider).

Third, a load/store pipeline (or load/store unit) 416 is coupled to integer mapping table 206. This pipeline includes a sixteen-entry address queue 308 which communicates with register file 306. The architecture of address queue 308 is described in detail in commonly-owned, co-pending patent application, Ser. No. 08/324,128, which is hereby incorporated by reference in its entirety for all purposes.

Register file 306 and address queue 308 feed integer address calculate unit 418 which, in turn, provides virtual-address entries for address stack 420. These virtual addresses are converted to physical addresses in joint translation lookaside buffer (JTLB) 422 and used to access a data cache 424.

Data input to and output from data cache 424 pass through store aligner 430 and load aligner 428, respectively. Address stack 420 and data cache 424 also communicate with external hardware controller and interface 434. Further, data cache 424 and controller/interface 434 communicate with secondary cache 432.

B. Operation

Processor 100 uses multiple execution pipelines to overlap instruction execution in five functional units. As described above, these units include the two integer ALUs 412, 414, load/store unit 416, floating-point adder 404 and floating-point multiplier 400. Each associated pipeline includes stages for issuing instructions, reading register operands, executing instructions, and storing results. There are also three "iterative" units (i.e., ALU#2 414, floating-point divide unit 408, and floating-point square root unit 410) which compute more complex results.

Register files 302 and 306 must have multiple read and write ports to keep the functional units of processor 100 busy. Integer register file 306 has seven read and three write ports; floating-point register file 302 has five read and three write ports. The integer and floating-point pipelines each use two dedicated operand ports and one dedicated result port in the appropriate register file. Load/Stote unit 416 uses two dedicated integer operand ports for address calculation. Load/Store unit also loads or stores either integer or floating-point values via a shared write port and a shared read port in both register files. These shared ports are also used to move data between the integer and floating-point register files.

In a pipeline, the execution of each instruction is divided into a sequence of simpler operations. Each operation is performed by a separate hardware section called a stage. Each stage passes its result to the next stage. Usually, each instruction requires only a single cycle in each stage, and each stage can begin a new instruction while previous instructions are being completed by later stages. Thus, a new instruction can often begin during every cycle.

Pipelines greatly improve the rate at which instructions can be executed. However, the efficient use of a pipeline requires that several instructions be executed in parallel. The result of each instruction is not available for several cycles after that instruction enters the pipeline. Thus, new instructions must not depend on the results of instructions which are still in the pipeline.

Processor 100 fetches and decodes instructions in their original program order but may execute and complete these instructions out of order. Once completed, instructions are "graduated" in their original program order. Instruction fetching is carried out by reading instructions from instruction cache 102, shown in FIG. 1. Instruction decode operation includes dependency checks and register renaming, performed by instruction decode and dependency logic 200 and mapping tables 204 or 206, respectively. The execution units identified above compute an arithmetic result from the operands of an instruction. Execution is complete when a result has been computed and stored in a temporary register identified by register file 302 or 306. Finally, graduation commits this temporary result as a new permanent value.

An instruction can graduate only after it and all previous instructions have been successfully completed. Until an instruction has graduated, it can be aborted, and all previous register and memory values can be restored to a precise state following any exception. This state is restored by "unnaming" the temporary physical registers assigned to subsequent instructions. Registers are unnamed by writing an old destination register into the associated mapping table and returning a new destination register to the free list. Renaming is done in reverse program order, in the event a logical register was used more than once. After renaming, register files 302 and 306 contain only the permanent values which were created by instructions prior to the exception. Once an instruction has graduated, however, all previous values are lost.

Active list 212 is a list of "active" instructions in program order. It records status, such as which instructions have been completed or have detected exceptions. Instructions are appended to its bottom when they are decoded. Completed instructions are removed from its top when they graduate.

II. Load/Store Unit

A. Load/Store Unit Overview

Microprocessor 100 uses register files 306 and 302 to store integer and floating point register values, respectively. As such, the width of each file is equal to the width of microprocessor's data path. Since physical registers are used also to store tentative results for instructions which are completed but not yet graduated, register files 302 and 306 should contain more physical registers than there are logical registers. In one embodiment, register files contain 64 physical registers, twice the number of logical registers. Multiple read and write ports are provided for each register file to allow data to be read and written from microprocessor's various functional units in parallel.

Primary instruction cache 102, data cache 424, and branch stack 216 are interconnected by a data path. To minimize the necessary wiring, the functional units share the data path. Sharing data paths creates bus contention. This problem is alleviated by employing a two phase-multiplexed unidirectional data paths to interconnect the functional units.

Load/Store Unit 416 facilitates data transfer instructions between microprocessor's register files, data cache 424, and main memory such as "loads", "stores", "prefetch", and "cache" instructions.

Normally, main memory is accessed via data cache 424. Data cache greatly improve memory performance by retaining recently used data in local, high speed buffer memories. Microprocessor 100 also includes secondary cache 432 to augment the data cache. Depending on availability of space, secondary cache 432 may be implemented as a separate chip.

All "cached" operations first access data cache 424. If the data is present therein (a "cache hit"), a load can be completed in two cycles. Otherwise, access to secondary cache is initiated. If it "hits", the primary cache is "refilled", and a load takes at least 8 cycles. Otherwise, main memory must be read and both caches refilled. In such cases, a load would take significantly longer.

Microprocessor 100 executes cached operations "out-of-order". An instruction's address can be calculated as soon as its index registers are valid, even if previous instructions are waiting for their index registers to become valid. Cache misses do not block later instructions ("non-blocking"); the unit can begin new operations while as many as eight cache misses are processed.

"Uncached" operations bypass the caches and always access the system bus. Typically, uncached operations access input/output devices or special-purpose memories.

Uncached operations are executed only when the instruction is about to graduate. Uncached operations must be performed sequentially in original program order because they cannot be undone in the event of an exception. Both uncached writes and reads may alter the state of the I/O subsystem. Uncached operations are kept in the address stack, but no dependency checks are performed for them. The operand of an uncached store is copied into the Store Buffer, but no load bypass can occur. When the store graduates, the buffered data is transferred to the external interface.

Although uncached operations are delayed until they graduate, cached operations may proceed out of order. That is, subsequent cached loads may be executed, and cached stores may initiate tag check and cache refill operations.

Prefetch instructions are used to fetch memory blocks into the primary and secondary caches. They are used to increase performance by reducing delays required to refill caches, but they have no effect on the logical execution of the program. Prefetch instructions can significantly improve programs which have predictable memory accesses but have a high cache miss ratio. However, improper use of prefetch instructions can reduce performance by interfering with normal memory accesses.

There are two formats of prefetch instructions, so that either "base+offset" (PREF, opcode 63 octal) or "base+index" (PFETCH, opcode 23 function 17 octal) addressing may be used. These instructions are defined in C. Price, MIPS R10000-MIPS IV ISA Manual, MIPS Technologies, Inc. (1994). Each format includes a 5-bit "hint" field which indicates what prefetching operation is expected. However, the architecture allows any hardware implementation to ignore the hint field or the entire instruction because it does not affect the program's result. If any problem is encountered, prefetch instructions are aborted without generating any exceptions.

Prefetched data is loaded into both the secondary and primary data caches. The "hint" field applies to both caches.

If the external interface is busy when the address queue executes a prefetch instruction, the queue will retry that instruction later. However, if the addressed cache set cannot be refilled due to a dependency lock or previous refill operations, the instruction causes no action.

Microprocessor 100 uses only the low three bits of the hint field. If bit 0 is set, the cache will request an exclusive copy of the cache block, which can be written. Otherwise, the cache will request a shared copy of the cache block. If bit 2 is set, bit 1 selects which way is refilled if there is a cache miss. If the selected way is locked or already in refill in the primary data cache, the prefetch instruction causes no action.

Prefetch instructions are decoded, queued, issued, and tag-checked like other memory operations. But the prefetch is marked "done" after only a single tag check cycle. If there is a cache hit (with the required write permission), the instruction is complete. If there is a miss and a cache block is available, a cache refill operation is requested from the external interface. The refill status is recorded in the cache tag. However, because the entry in the address stack is "done", it will not wait for the refill to be completed.

The Load/Store unit can speculatively execute instructions. These must be aborted in case a branch is reversed. If an aborted instruction imitated a cache refill, the refill operation must be completed. These refills are called "orphans" because they no longer correspond to any instruction in the processor. Prefetch instructions also create orphans because they are "done" as soon as the initial tag cycle is completed.

The address tag of this cache block remains in a "refilling" state until the cache refill has been completed. If a subsequent instruction addresses this cache block, it can use this block, initially in a "wait on refill" state.

B. Operation

Figure 2:
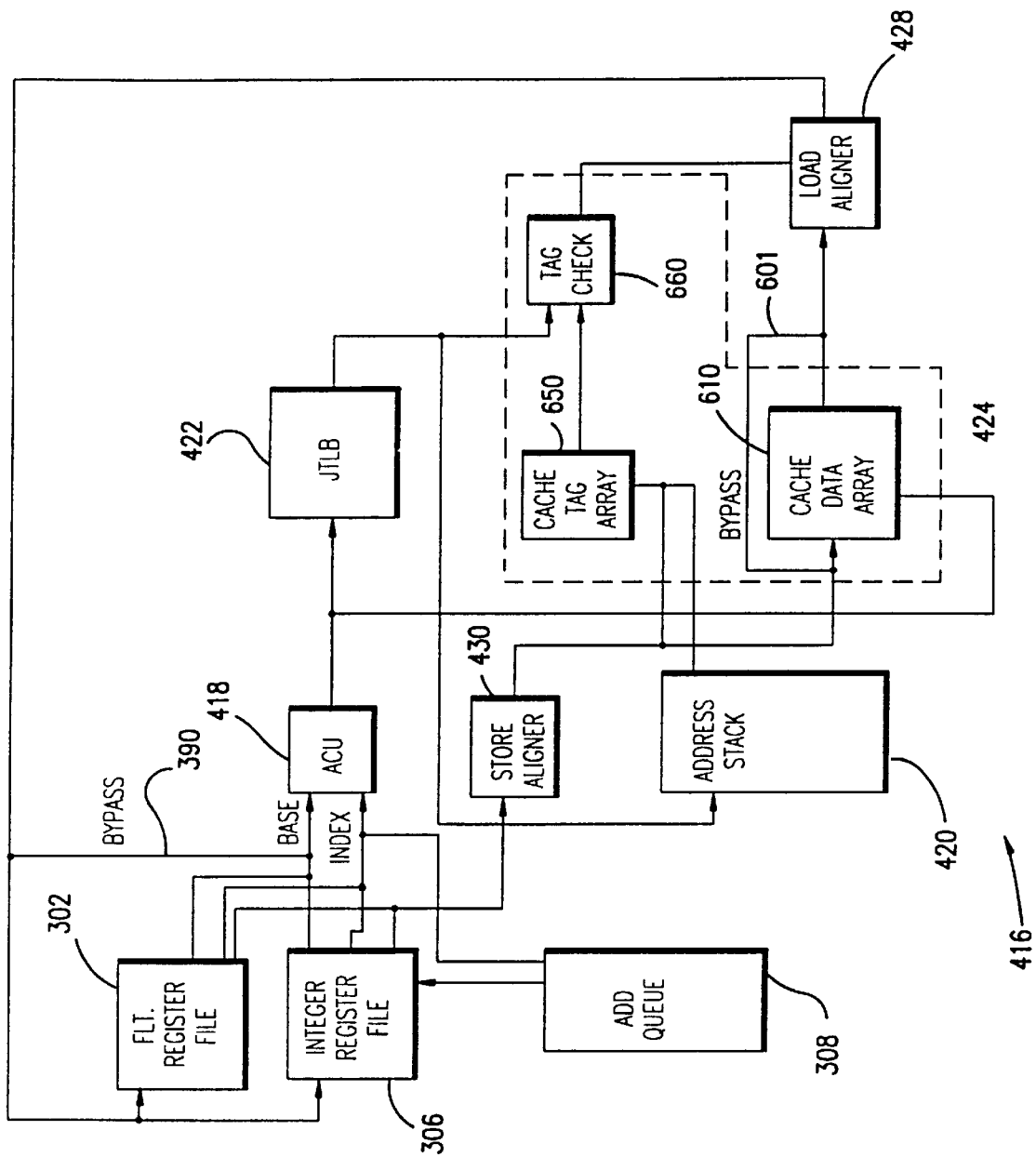
FIG. 2 discloses a functional block diagram of a load/store unit.

Referring to FIG. 2, Load/store Unit 416 comprises an address queue 308, address stack 420, address calculate unit (ACU) 418, store aligner 430, load aligner 428, translation lookaside buffer (JTLB) 422, and data cache 424. Data cache 424, being a set-associative data cache, comprises cache tag array 650, cache data array 610, and the tag check logic 660. The TLB and data cache are configured to operate in parallel so as to reduce the latency for load instructions, translating to about 15% performance improvement in operating speed.

Address queue 308 communicates with register file 306 and address calculate unit 418. Address queue, containing 16 entries organized as a circular first-in first out (FIFO) buffer, keeps track of all memory instructions such as loads, stores, and "Cache" instructions that manipulate any of the caches. Any time a memory instruction is decoded, it is allocated to the next sequential entry at the bottom of the queue. When an instruction graduates, it is deleted from the top of list. Graduation occurs if the instruction completes without an error and all previous instructions have graduated. Instructions are graduated in the original program order even though they may not have been executed in order.

Each entry in the address queue comprises several instruction fields which are exemplified in Table I. A more detailed description of the contents and structure of the address queue can be found in commonly owned and co-pending patent application Serial No. 08/324,129.

TABLE I

Address Queue Instruction Fields

| Bits | Field | Description |
| --- | --- | --- |
| 1 | AQvActiveF | Entry is active. (Decoded from queue pointers, delayed one cycle.) |
| 5 | AQvTag | Active List tag uniquely identifies this instruction within the pipeline. |

TABLE I-continued

Address Queue Instruction Fields

| Bits | Field | Description |
| --- | --- | --- |
| 7 | AQvFunc | Instruction opcode and function: |
|  | 0nnnnnn | 6-bit major opcode (modified during instruction predecode), or |
|  | 10nnnnn | 6-bit function code from COPIX opcode (AQ gets codes #00–#37 octal only.) |
|  | 11 fff cc | 5-bit subfunction code for CACHE operations (3-bit function, 2-bit cache select.) |
| 16 | AQvImm | 16-bit immediate field contains instruction bits [15:0]. Base Register: |
| 6 | AQvOpSelA | Operand A, select physical register# in Integer Register File. |
| 1 | AQvOpRdyA | Operand A is ready for address calculation. |
| 1 | AQvOpValA | Operand A is vaiid for address calculation (Integer register# is not zero.) Index Register, or Integer Operand: |
| 6 | AQvOpSelB | Operand B, select physical register# in Integer Register File. (For integer stores, this 6 bit value is duplicated in AQvOpSelC.) |
| 1 | AQVOpRdyB | Operand B is ready. |
| 1 | AQvOpValB | Operand B is valid. (Integer register# is not zero.) Floating Point Operands |
| 6 | AQvOpSelC | Operand C, select physical register# in Flt. Pt. Register File. (For integer stores, this field contains a copy of AQvOpSelB.) |
| 1 | AQvOpRdyC | Operand C is ready. |
| 1 | AQvOpValC | Operand C is valid. |
| 6 | AQvDest | Destination, select physical register#. |
| 2 | AQvDType | Destination type (or hint): 00=No destination register. (If prefetch instruction, hint="shared".) 01=No designation register. (If prefetch instruction, hint="exclusive".) 10=Integer destination register. 11=Floating-point destination register. |
| 4 | AQvUseR | Which ports of the shared register files are required to execute this instruction? Bit 3: Flt.pt. Write. Bit 2: Flt.pt. Read. Bit 1: Integer Write. Bit 0: Integer Read. |
| 1 | AQvStore | This instruction is a store. |
| 1 | AQvFlt | This instruction loads or stores a floating point register. |
| 1 | AQvFltHi | Load or store high half of floating-point register (if FR=0). |

When the operands for a memory instruction are available, address queue issues it for execution by sending the necessary operands to the ACU 418. For "Indexed" operations, ACU receives base register and index register operands from Register File 306. As for other load or store instructions, address queue provides a base register operand via Register File 306 and an immediate value directly.

ACU 418 calculates a virtual address corresponding to the operands it received during the previous cycle. As discussed, data cache is virtually indexed and physically tagged. As such, the virtual address is divided into two portions, the "tag" and "index". The index of the virtual address is passed to the cache to determine which cache location to access while the TLB 422 translates the virtual address into a physical address or real page address. The architecture of the TLB and virtual memory is discussed in detail in commonly owned and co-pending application Ser. No. 08/324,128. The real page address, referred to as the tag or physical tag, is stored in cache Tag array 650.

While TLB is translating the virtual address into a physical address, the virtual index is used to access data and tag in data cache data array and cache tag array, respectively. In this manner, the physical address, tag, and data are available simultaneously. Tag check 660 compares the tag and physical address and, if there is a match, generates a hit signal to indicate that the requested data is present in the data cache. The requested data are aligned by load aligner 428 according to the lower address bits and then written to its destination in register files 302 or 306.

A store path is provided for writing register values from register files 302, and 306 into data cache 424. Store aligner 430 aligns the data to be written into the cache. Bypass path 601 enables data for uncached operations to bypass the data cache.

Additionally, a bypass path 390 is provided to improve performance of the load/store unit. Bypass path 390 allows data to circumvent the register files or memory when microprocessor is reading a location during the same cycle it is written. For example, the result of an execution unit can be multiplexed directly into its operand registers so that a dependent instruction can be executed while that result is written into the register file. This bypass is selected whenever the operand register number equals the previous instruction's destination register number.

The physical tag and virtual index are also written into address stack 420, which is logically part of the address queue but physically separate due to layout considerations. Microprocessor uses address stack 420 to store physical memory corresponding to each instruction in the address queue. Consequently, address stack is implemented with the same number of entries as address queue. Data are loaded into the address stack 420 during address calculation sequence. The address stack is described in detail in commonly owned and co-pending patent application Serial No. 08/324,129.

III. Data Cache

A. Data Cache Overview

The specification and operations for the data cache is included as Appendices I and II.

Data cache 424 is used to load and store instructions that access "cacheable" regions of main memory. The data cache 424 is interleaved with two identical banks, bank "0" and bank "1".

Figure 3:
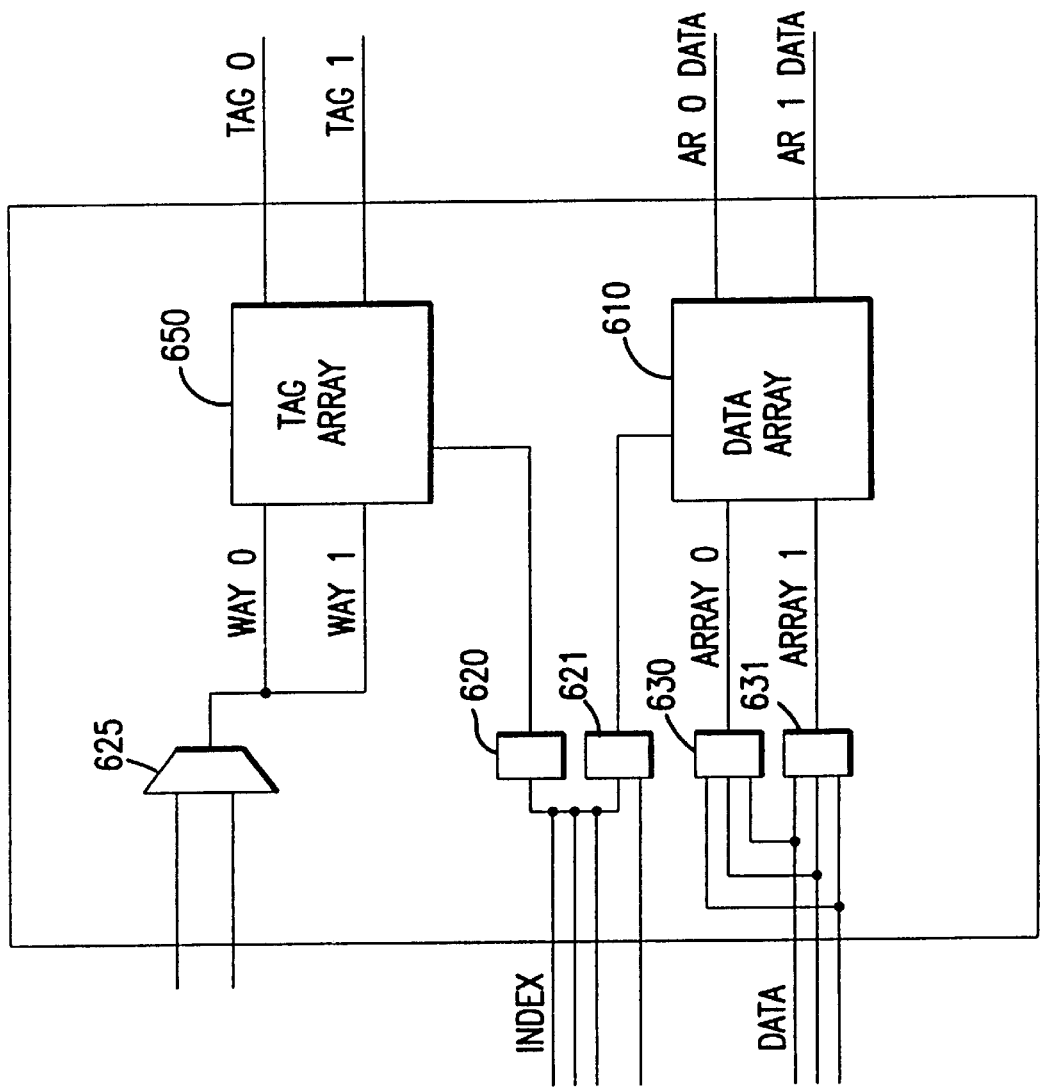
FIG. 3 discloses a block diagram of a cache bank.

Referring to FIG. 3 each bank comprises a tag cache array 650 and cache data array 610. The tag array stores the tag associated with a block of data in the data array. The data array, on the other hand, retains recently used memory data.

In one embodiment, microprocessor 100 employs a 32 K-byte data cache. As such, each data array comprises 16 K-byte divided into 256 rows or word lines, each containing two blocks of 4 doublewords (8 words). Each doubleword has 64 bits plus 8 parity bits for a total of 72 bits. The data array can access two doublewords in parallel. As for tag array 650, it has 64 rows of 35 bits each and can access two 32 bit tags in parallel.

Bank 0 and bank 1 operate independently and are accessed depending on the values of the virtual index. The tag and data arrays are allocated among requests from address queue, address stack, ACU, and external interface. Some instructions allow the tag and data array to operate independently. For example, store instructions require only the tag array, thus leaving the data array free. Thus, the four functional units can conceivably operate simultaneously if they are allocated the cache array(s) they need.

Each bank is 2-way set-associative. In effect, cache data array 610 and cache tag array 620 are each sub-divided into two sub-arrays or ways to provide an additional location into which main memory addresses with shared index bits can be mapped. This decreases thrashing in the cache and improves the hit rate without having to increase the size of the cache.

Sub-arrays for tag array 650 are referred to as way "0" and way "1"; those for the data array are referred to as sub-array 0 and sub-array 1. Thus, tag array can access two tags (tag 0 and tag 1) in parallel and each data array can access two doublewords (ar0data and ar1data) in parallel. For CPU and external "interrogate" operations, Tag0 and tag1 are checked in parallel (read and compared) to determine which way of the cache, if any, contains the desired data. The way is remembered and used later for graduating stores or for external refill or writeback operations.

The arrays are "virtually indexed" using the index portion (bits 13:0) of the virtual address. Bit 5 selects bank #0 or bank #1. Bits 2:0 select a byte within a doubleword and bits 4:3 select a doubleword within a block. Bits 13:6, which address a block within an array, are decoded to select one of 256 "word lines". Each word line contains 8 doublewords or two blocks. The bits are interlaced so that doublewords within these blocks are accessed differently for processor or external interface operations. The processor associatively accesses doublewords with two blocks. On the other hand, external interface accesses two doublewords within the same block.

Separate address multiplexers are provided for data and tag arrays. Multiplexer 621 selects address inputs from among external interface, address queue, address stack, and ACU for use by data array 610. As for the tag array, multiplexer 620 selects address inputs from external interface, address stack, or ACU. Select signals (select tag and select data) for multiplexer 610 and 620 are generated by address queue and decoded by cache control logic in order to determine which functional unit is controlling-each array, as shown in Table II.

TABLE II

Data Cache Index Address

| Enable | Select | Input Address (Virtual) | Data Width | Description |
|---|---|---|---|---|
| 0 | 00 | (none) | — | Power down. Do not enable any word line or amplifier. |
| 1 | 00 | ACAdr[13:3] | 64 | Address calculation. |
| 1 | 01 | ASIndex[13:3] | 64 | Retry tag check or load using address from Address Slack. |
| 1 | 10 | ASStore[13:3 ] | 64 | Address for writing data into the data array during graduation of a store instruction. (Not used for tag arrays.) |
| 1 | 11 | ExtIndex[13.4] | 128 | Address from external interface, for refill or interrogate. |

Separate data multiplexers are also provided for tag and data arrays. Multiplexer 625 selects an address from either the external interface or JTLB to write to the tag array. Multiplexers 630 and 631 select among data from external interface or register files for writing into the data array.

When a cache section is not used as indicated by an address selection value of "00", it is powered down. In power-down mode, the address decoder is disabled so that it does not select any word line; the dummy word line is disabled so that none of the sense amplifiers turn on. The decoder is disabled using an extra input in the first level of gates.

In some embodiments, the data cache is not initialized by hardware during reset. These embodiments require a bootstrap program to initialize all tags to the "Invalid" state before it makes any use of the data cache. If a block is "Invalid", the contents of its data array are not used.

B. Data Array

1. Data Array Organization

Figure 4:
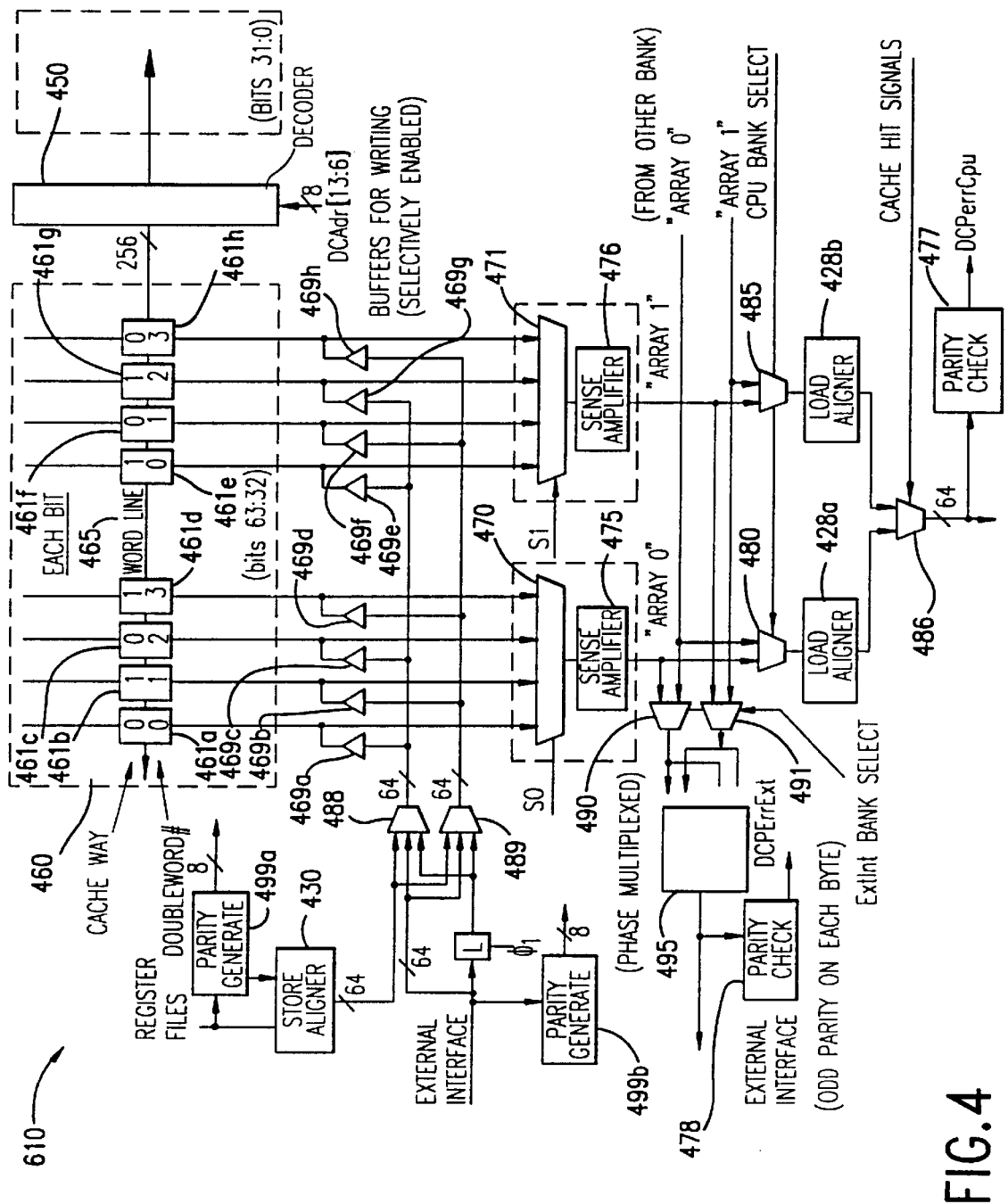
FIG. 4 discloses a block diagram of a cache data array and control logic.

Referring to FIG. 4, data array 610 contains 256 rows. Decoder 450 selects which row is accessed by driving its "word line". high. Each word line drives a row of 576 cells (512 data bits and 64 parity bits) or bits and is gated and buffered every 32 cells. The 576 bits equals one cache set with each way containing 4 doublewords (a word equals 4 bytes).

Each-bit, as represented by 460, in a doubleword contains eight cells 461a–461h. The cells correspond to one bit from each of the four doublewords in each way of the cache. The number on the top of each cell represents the cache way; the number on the bottom represents the doubleword number within the way.

Multiplexer 470, controlled by signal S0, selects 1 of 4 bits (1 from each of the 4 doubleword in the block) to input into sense amplifier 475. Output of sense amplifier represents data from sub-array 0. Similarly, S1 controls which bit multiplexer 471 and sense amplifier 476 is read from sub-array 1.

Microprocessor 100 uses different select signals S0 and S1 for processor and external interface accesses due to their different access patterns. Select signal for external interface operations uses virtual address bit 4:3 and way bit;

CPU accesses use virtual address bits 4:3. Access pattern for CPU and external interface is shown in Table III.

TABLE III

Sense Amplifier Multiplexer in Data Cache

CUP Accesses (64-bits, Associative)

| Adr[4:3] | S0 (Array 0) | S1 (Array 1) |
|---|---|---|
| 00 | 1000 | 1000 |
| 01 | 0100 | 0100 |
| 10 | 0010 | 0010 |
| 11 | 0001 | 0001 |

External Interface (128-bits in one way)

| Adr[4] | Way | S0 (Array 0) | S1 (Array 1) |
|---|---|---|---|
| 0 | 0 | 1000 | 0100 |
| 0 | 1 | 0100 | 1000 |
| 1 | 0 | 0010 | 0001 |
| 1 | 1 | 0001 | 0010 |

Data from sub-array 0 and sub-array 1 are either loaded into the register files or written to main memory via external interface. For register loads, data are multiplexed with corresponding sub-array 0 and sub-array 1 data from the other cache bank by multiplexer 480 and 485. Select bank signal (bit 5) passes data from the appropriate bank to load aligner 428a and 428b, respectively, and into multiplexer 486. Cache hit signals, generated from tag check logic, dictate which data, if any, are read out of the cache. Whenever the cache is read and its tag indicates a valid entry, all bytes are checked for proper parity by parity checker 477. If any byte is in error during a load instruction, the processor takes a "Data Cache Error" exception.

As for writes to memory, multiplexer 490 and 491 select the desired data as indicated by virtual addtess bit 5. Thereafter, the data is passed into phase multiplexer circuit 495, which writes the first doubleword during $\phi_1$ of the clock cycle and the second doubleword during $\phi_2$ of the same clock cycle. Parity checker 478 checks all bytes of the doubleword for proper parity, and if any error occurs, the processor takes an "External Interface Data Cache Error" exception.

Data are written into the cache arrays either from the register files or from external interface. Data from register files are aligned by store aligner 430 and multiplexed with data from the external interface by multiplexers 488 and 489. Multiplexers select the data according to the select signals and write into cache via drivers 469a–469h located at the bottom of each column of cells. These drivers are enabled according to the address being written. An even parity bit generated by parity generator 499a for register stores or parity generator 499b for external interface stores is appended to each byte stored in the data cache. Each parity bit is written whenever its byte is written.

As previous discussed, data cache arrays are organized for two distinct access patterns. For loading or copying a block to secondary cache, the two data arrays access a pair of adjacent doublewords in the same block. For reading, which occurs simultaneously with the tag check, each addressed word is read from both blocks, and the block with the matching tag is selected. The data from the other block is ignored. For writing, which occurs after the tag check has been completed, only the addressed block is written.

Figure 5:
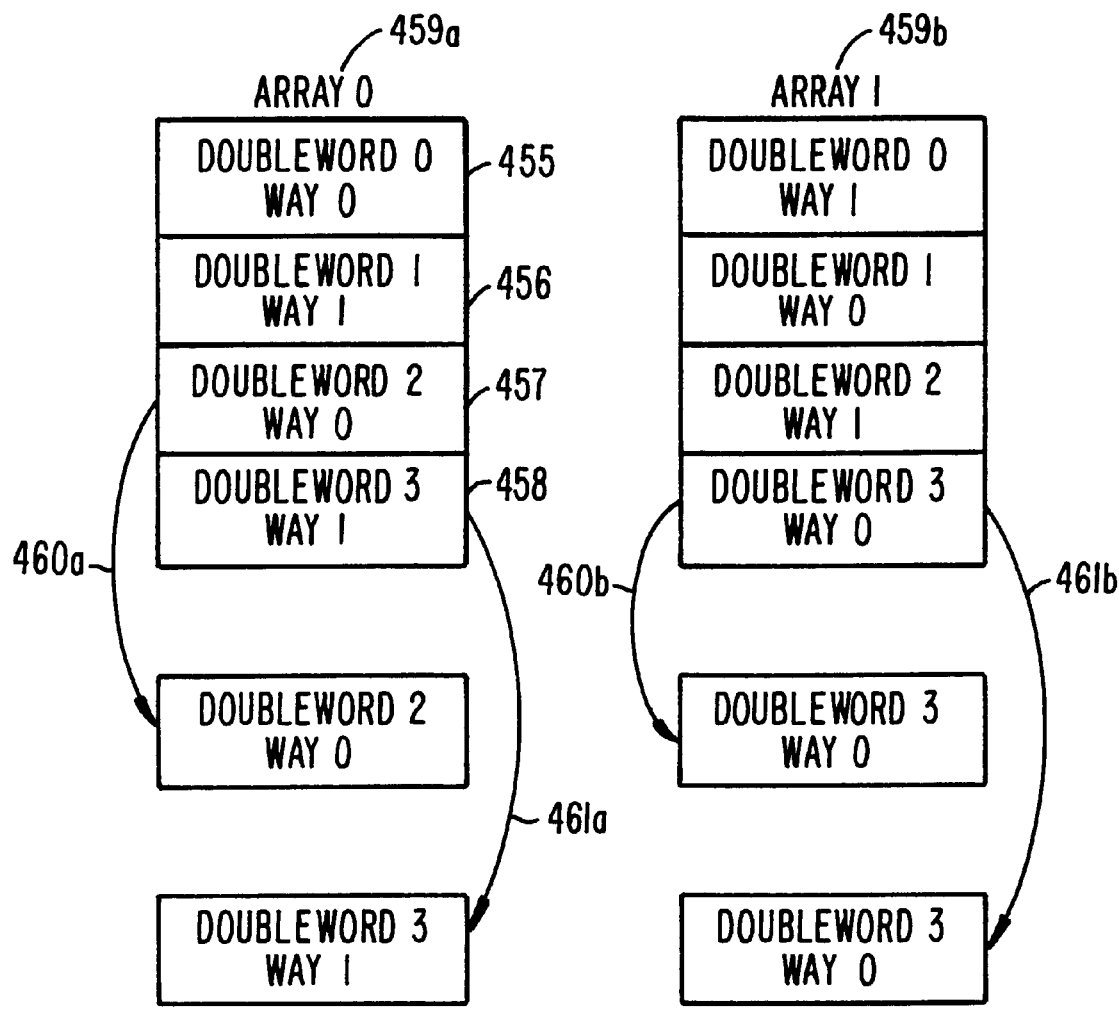
FIG. 5 discloses the block organization within each bank of the cache data array.

Referring to FIG. 5, each array is configured such that words 455–458 therein alternate between the two cache ways to allow either access pattern. This is why the arrays do not correspond to cache ways.

Each cache set contains two blocks (e.g., block 0 and block 1) which belong to Way 0 and Way 1. Within each block, the four datawords alternate between the two data arrays. This permits two distinct access patterns. When the cache is loaded or copied back (e.g., external interface access), two doublewords in the same block are accessed simultaneously, as indicated by lines 460a and 460b in FIG. 5. However, when the cache is read (e.g., CPU access), the same doubleword location is simultaneously read from both blocks within the set, as indicated by lines 461a and 461b in FIG. 5. The addressed data is selected by tag circuitry.

Accordingly, doublewords 0 in either array. For block 0, even doublewords (Adr[3]=O) are in Array 0 and odd doublewords are in Array 1. This is reversed for block 1. This allows access of a two doubleword from the same way which otherwise would be impossible in conventional 2-way set-associative caches, unless the data line from each way is 2-doublewords in width. This requires twice the number of sense amplifiers.

Also, by using multiplexers, the external interface can swap doublewords within its quadword accesses.

Sense amplifiers, in comparison to ram cells, are relativelylarge. As such, the density of the cache arrays is limited by the width of the sense amplifiers. By employing multiplexers, the number of sense amplifiers is reduced by a factor of four, allowing the ram cells to be more densely packed. The benefits which result are twofold. First, by being able to locate the cells in closer proximity to each other, the propagation delay of array is decreased. Second, the significant savings in chip space can be used for decreasing the die size to reduce cost, and/or designing more aggressive functional units to effectively increase CPU performance.

Figure 6:
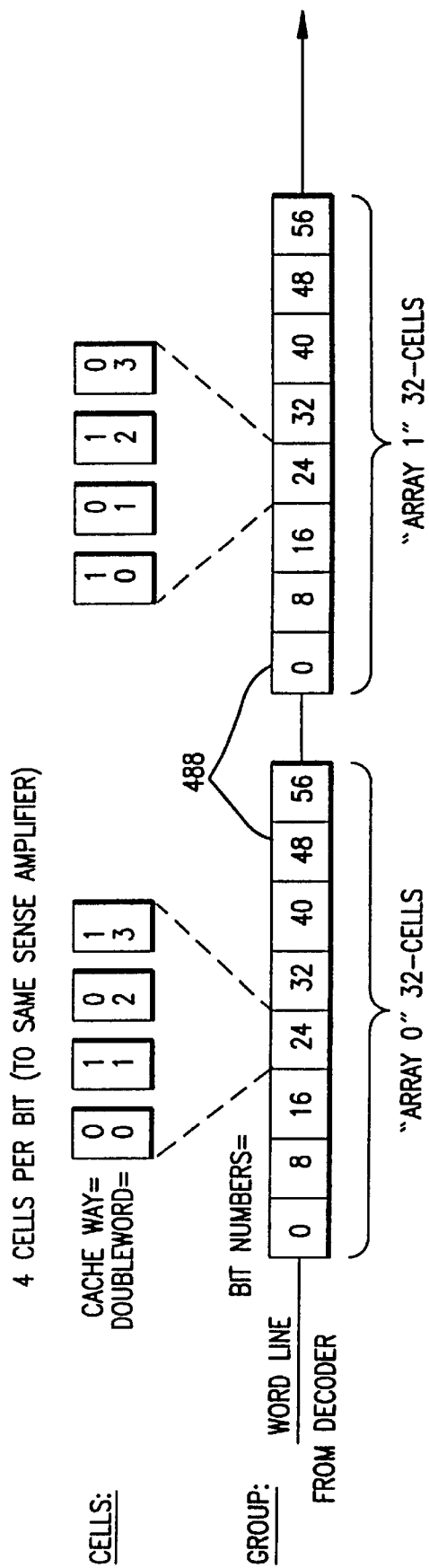
FIG. 6 illustrates the bit arrangement within each bank of the data cache.

Referring to FIG. 6, the 576 cells of each line are arranged in a pattern which minimizes the wiring in the load and store aligners. At the high level, bits are interlaced by their position within bytes. That is, each doubleword contain eight 8-bit bytes, and the bits are numbered 0 to 7 within each byte, which equals the bit number modulo 8. All "bits 0. . ." are grouped together (bits 0, 8, 16, 24, 32, 40, 48, 56), then "bits 1. . ." are grouped, etc.

For each sub-array, there are 32 cells within each bit group 488. Due to the dense layout of the cells, there is only room for a single local word line per row. These 32 cells consist of four cells for each of the eight bits within the bit group. These four cells are adjacent and wired to the same sense amplifier. One of these cells is selected by a 4-to-1 multiplexer, which has already been discussed.

Each bank of the cache array includes 148 sense amplifiers along the bottom edge. Of these, 144 amplifiers read 64 bits of data and 8 bits of parity for each of the two arrays. Each of these amplifiers is beneath four columns of cells and includes a 4-to-1 input multiplexer.

2. Data Array Control Logic

Figure 7:
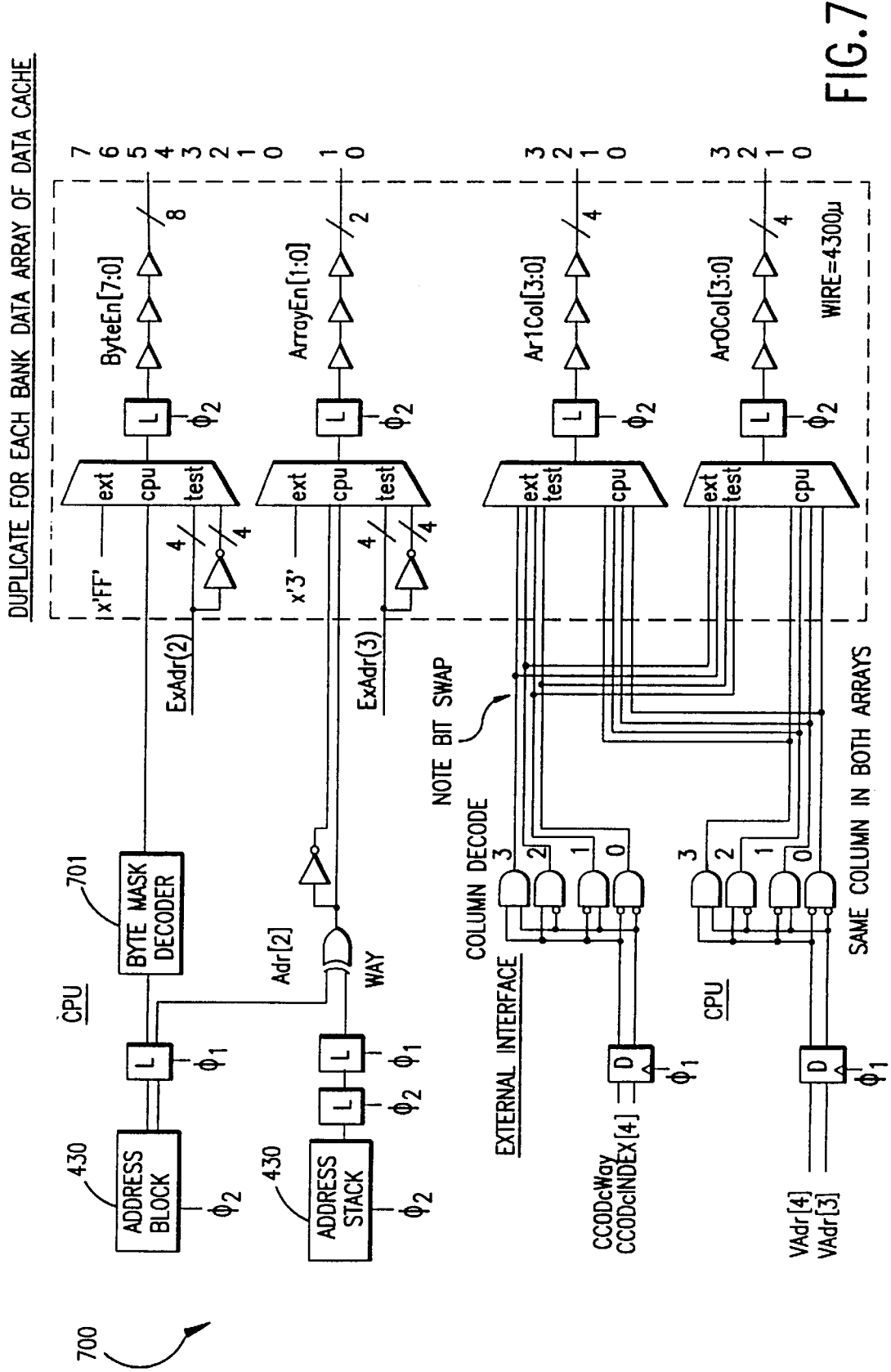
FIG. 7 discloses a logic diagram of the cache control logic.

Referring to FIG. 7, the logic 700 controls the data cache. Each bank of the Data Cache can be read or written either by the processor or by the external interface. Two operations can occur simultaneously on separate banks. The processor writes bytes within a doubleword (64-bits). Byte mask decoder 701 decodes the 8-bit byte mask from the address stack to control the writing of each byte. Writing is enabled in each bank if a store instruction graduates and its bank is selected. The external interface writes an entire quadword (128-bits). Writing is enabled using the "refill" or "refill done" command. Select bank signal determines which bank's cache array is written.

The processor reads a cache bank if its select bank is selected. The external interface reads a cache bank if the command is "Data Read". Select bank signal dictates to which bank data is written.

Figure 8:
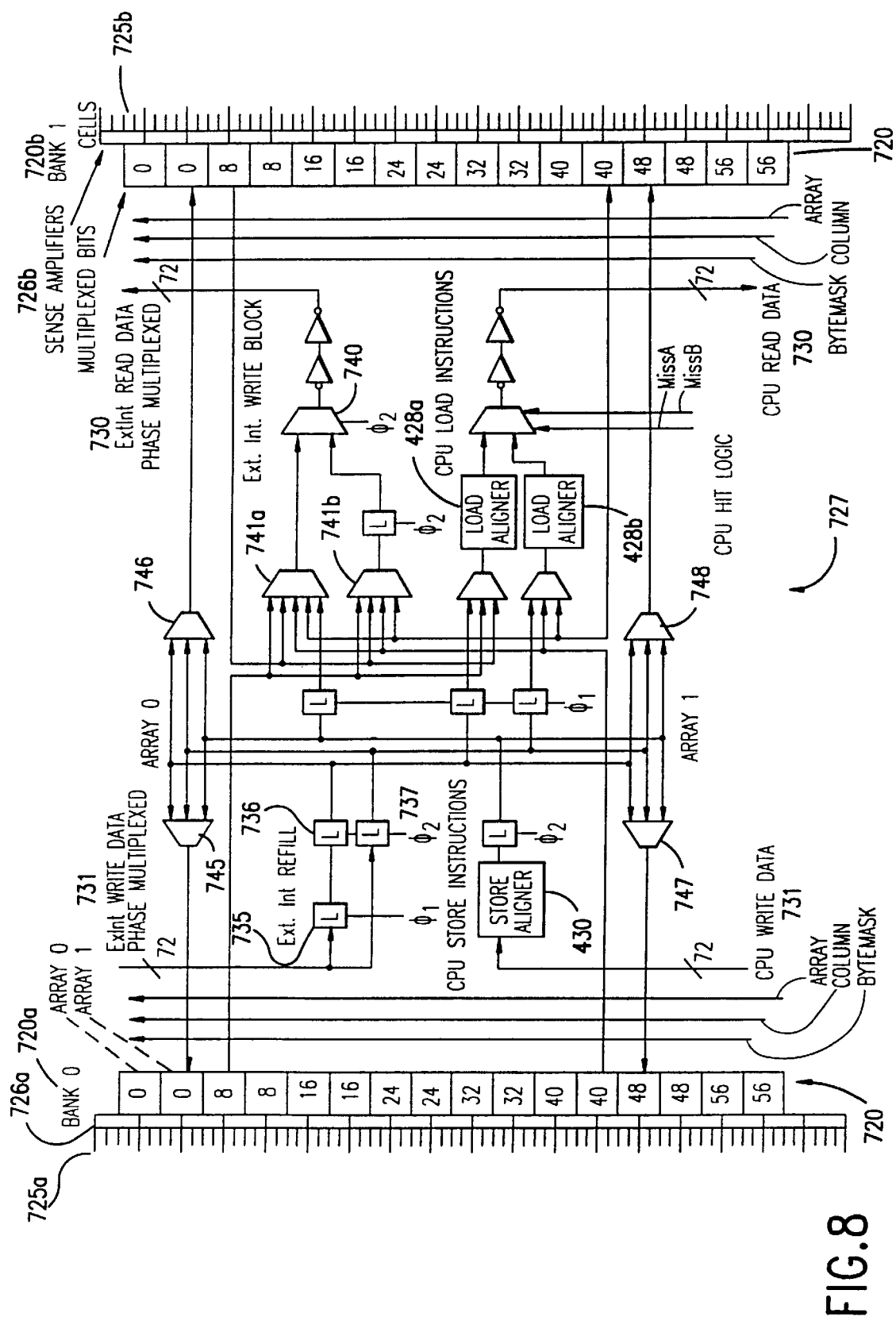
FIG. 8 discloses the connection between the two banks of the cache.

FIG. 8 illustrates an 8-bit slice, including all bits equal to 0 modulo 8. Data cache contains two identical banks 720a and 720b, each having redundant columns of memory cells 725a and 725b which can be used to replace defective columns. These banks are physically adjacent, with a 500 $\mu$A-wide wiring channel 727 between them. Their layouts are mirror images, so that all read and write amplifiers 726a and 726b are adjacent to the channel.

The CPU and the External Interface each read and write the data cache. The CPU does doubleword operations, which contain 64 data bits plus 8 parity bits (72 bits total). The External Interface does quadword operations, which contain 128 bits plus 16 parity bits (144 bits total). To minimize wiring, this data is phase multiplexed onto a doubleword bus. The CPU and External Interface each use 72-bit wide unidirectional buses 730 and 731 for reading and writing, respectively. These buses can share channels. Each CPU bus is full width at the bottom of the Data Cache but tapers to zero width at the top; each bus is full width at the top but tapers to zero width at the bottom.

These buses and associated control signals are wired in metal 3. The channel is wire limited.

The external interface writes the data cache only during refill operations. Two doublewords are transferred during the cycle prior to the write cycle. The first doubleword is latched twice, using phase-1 and phase-2 latches 735 and 736. (This creates an edge-triggered register which is clocked mid-cycle.) The second doubleword is latched in the phase-2 latch 737 at the end of the cycle. This data is written into either cache bank during the following phase 1. For way 0, the first doubleword is written into sub-array 0 through multiplexer 745 or 746, and the second doubleword is written into sub-array 1 using multiplexer 747 or 748. For way 1, the doublewords are reversed.

External interface reads the data cache only for write-back operations. It always reads one quadword per cycle. This data is latched in a phase-1 latch within each sense amplifier. This data is sent in two doublewords during phase 2 and the following phase 1. For speed, the sending multiplexer 740 is selected directly using the clock 741a and 741b. Its inputs are driven by two 72-bit 4-to-1 multiplexers. The second doubleword is latched in a phase-2 latch, so that its output will remain valid during phase 1 of the following cycle. Each input can be selected from either array of either bank. For way 0, the first doubleword is selected from array 0, and the second doubleword is selected from array 1. For way 1, the doublewords are reversed.

For uncached load instructions, External Interface data bypasses the cache into the CPU's load aligner 428a and 428b, as in a freeload operation, except that no data is written into the cache. For uncached store instructions, CPU data bypasses the cache and is sent to External Interface during the following phase 2.

C. Tag Array

1. Tag Array Organization

The cache tag array, which stores a 36-bit address tag for each 8-word block in the data array, has about an eighth as many bits as the data arrays. There are 64 word lines (one fourth as many as in the data arrays) and 288 cells per row (less than half as many). Thus, the tag access time is faster than the data array.

Like the cache data arrays, the cache tag array is divided into two identical banks and each can operate independently for either the processor or an external request. A bank is selected by the low bit of the block address (bit #5). Cache tag array is addressed by virtual address bits [13:6], which select a "set" of two blocks. There are 256 sets in each bank. Each set contains two blocks. Thus, the two banks contain 1024 blocks (cache size 32K-byte÷32-byte/block). The two tags in each set are read in parallel and are simultaneously compared to the desired physical address (bits 37:12) to determine if the cache contains the addressed data (a "hit").

Figure 9:
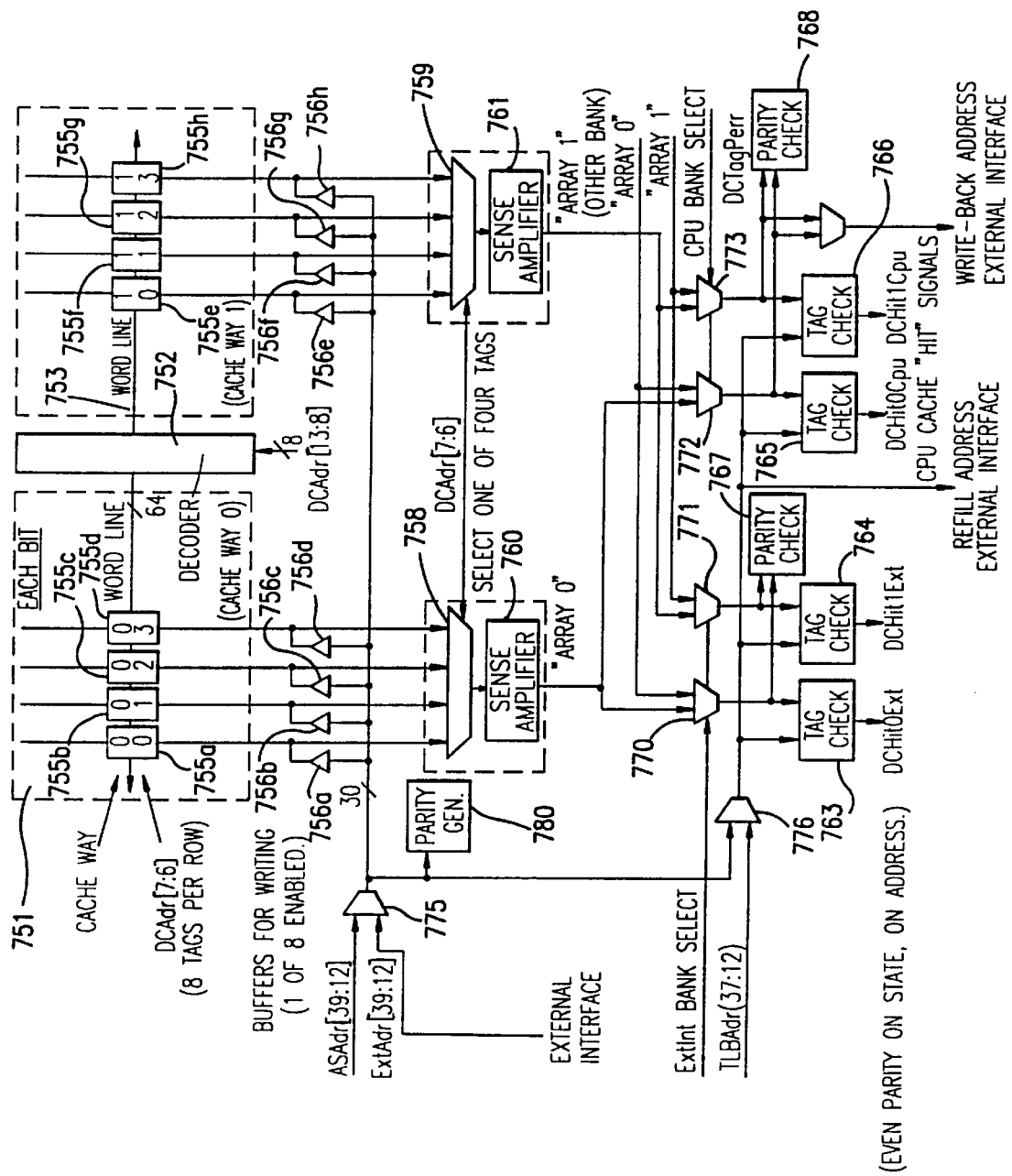
FIG. 9 discloses a block diagram of a cache tag array and control logic.

FIG. 9 illustrates one of the tag banks and associated control logic. The tag array contains 64 rows. Decoder 752 selects which row is accessed by driving its "word line" high using virtual address bits 13:8. Each word line 753 drives a row of 288, (8 36-bit tags). The 36 bits equals to one tag set with each way containing 4 tags.

For each bit 751 in the tag, eight cells 755a–755h are provided. The cells correspond to one bit from each of the four tags in each way of the cache. So for a 36 bit tag, this is repeated 36 times.

The number on the top of each cell represents the way; the number on the bottom represents the tag number within that row of the way. Unlike the data arrays, the tags bits are interleaved so that each sub-array contains only tags belonging to the same way.

Multiplexer 758, as determined by signal virtual address bits 7:6, selects one of four bits (1 from each of the 4 tags) to input into sense amplifier 760. Output of sense amplifier represents tag data (tag0) from way 0. Similarly, multiplexer 759 and sense amplifier 761 output selected tag data (tag1) from way 1. In this manner, two tags from each set are read in parallel (2 from bank 0 and 2 from bank 1). Again, the use of multiplexers reduce the number of sense amplifiers needed.

Each bank includes four tag check comparators: two for the processor (765 and 766) and two for the external interface (763 and 768). Each needs two comparators, because the cache is interleaved with two independent 2-way set-associative banks. Each bank can read two tags for either the processor or external interface. These tag signals are multiplexed using multiplexers 770–773 at the input of the comparators.

Microprocessors 100 employs multiplexer 776 to select either the translated physical address from the JTLB or an address from the address stack it compares with the tag. The JTLB is the critical timing path. The result of the compares are cache "hit" signals (hit if tag is present, miss if tag is not present). Also, the tags parity bit is checked by parity checker 767 and 768. A parity error causes an exception.

Tags from either the external interface or the load/store unit can be stored in the tag array. Multiplexer 775 selects the desired tag and buffers 756a–756h, which are selectively enabled according to the virtual index, write the data into appropriate location in the tag. Parity generator generates a parity bit whenever a tag is written into the array.

Figure 10:
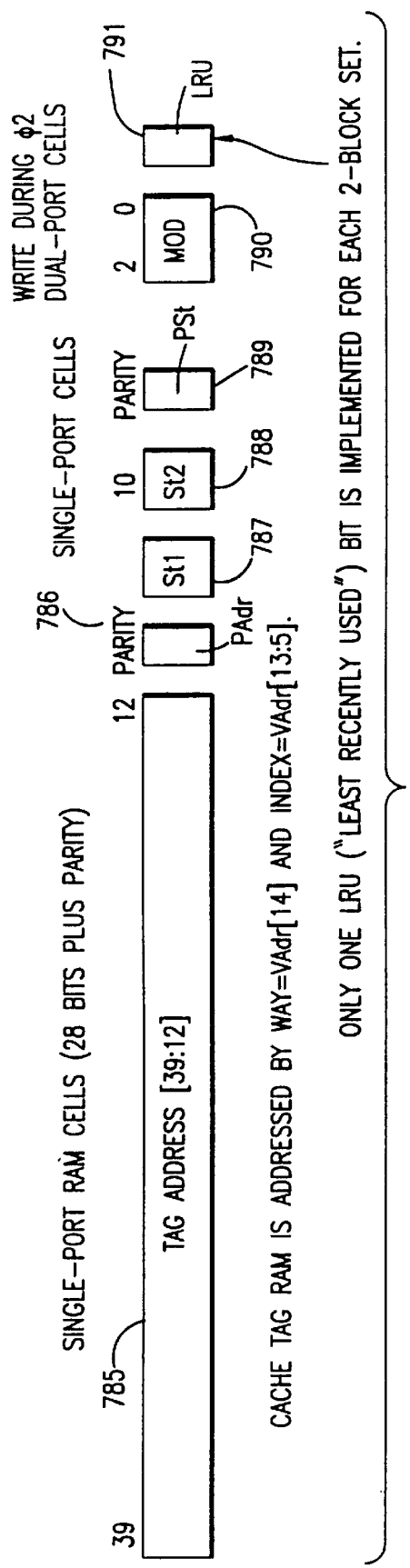
FIG. 10 discloses bit fields of the tag.

Referring to FIG. 10, each tag contains the following fields: address 785, parity 786, way 787, state 788, parity 789, modifier 890, and LRU (least recently used) 791. The tag fields are described in Table IV.

The state of each Data Cache block is determined by a 3-bit code. This code is formed by catenating the refill bit (TagStMod[2]) with the 2-bit state code (TagSt[1:0]). There are seven states.

Invalid (000, "N"): This block is empty. The address and data fields are ignored. The tag comparator always generates a "miss" for an invalid block.

Shared (001, "S") : This block is "Shared". That is, a valid copy of this block may also exist in other caches. The processor may read this block, but it may not modify it.

Clean Exclusive (010, "E"): This cache contains the only valid copy of this cache block. The processor may read this block, but it may not modify it until it has marked it "dirty"in both the primary and the secondary cache.

Dirty Exclusive (011, "D"): This cache contains the only valid copy of this cache block. It may read or write it.

Refill Clean (100"RC"): This cache has initiated a refill to load this block of the cache and is waiting for the data to be returned. This refill was initiated by a load instruction. The block's state may be shared or exclusive.

TABLE IV

Data Cache Tag Fields
(Signals are listed for Bank 0. Bank 1 signal mnemonics are similar, but include "Bank1" instead of "Bank0".)

| Bits | Group | Field | Description |
|---|---|---|---|
| 28 | Adr | DCBank0Way0Tag[39:12]<br>DCBank0Way1Tag[39:12] | These fields are implemented for both cache ways 0 and 1.<br>Physical address tag identifies the contents of this block. |
| 1 | Adr | DCBank0Way0TagP<br>DCBank0Way1TagP | Parity bit for address tag field. (Even parity.) |
| 2 | State | DCBank0Way0TagSt[1:0]<br>DCBank0Way1TagSt[1:0] | The refill bit in the state modifier and the two state bits determine the state of each cache block.<br>0,00 = Invalid. Block is empty<br>0,01 = Shared. Block may be read, but not written.<br>0,10 = CleanExclusive. Block may be written, but it has not yet been modified. Its contents equal the copy in main memory.<br>0,11 = DirtyExclusive. Block may be written. It has been modified.<br>1,00 = RefillClean. Block is being refilled for a load instruction.<br>1,01 = UpgradeShared. Converting "Shared" to "Dirty".<br>1,10 = UpgradeClean. Converting "Clean" to "Dirty".<br>1,11 = RefillDirty. Refill is being refilled for a store instruction. |
| 1 | State | DCBank0Way0TagSWay<br>DCBank0Way1TagSWay | Which way of the secondary cache was this block refilled from. This indicated where to write the block if it is written back to secondary cache. |
| 1 | State | DCBank0Way0TagStP<br>DCBank0Way1TagStP | Parity bit for state field and way bit. (Odd parity.) |
| 3 | Mod<br>2-port | DCBank0Way0TagStMod[2:0]<br>DCBank0Way1TagStMod[2:0] | Tag state modifier:<br>001 = Neither refill or written.<br>010 = Written. Block has been written by a store instruction. Cache block may be consistent with secondary.<br>100 = Refill. Cache block is being refilled or is waiting for its state to be modified. (See State bits.)<br>This bit is imptemented once per set in the cache. |
| 1 | LRU<br>2-port | DCBank0LRU | "Least Recently Used" way of this cache set.<br>"0" if Way 0 was least recently used by the processor.<br>"1" if Way 1 was least recently used. |

The address and tag bits have separate write enables, so the state bits may be modified without changing the address bits. Thus, these fields must have separate parity bits 786 and 789.

When a block is refilled from Secondary Cache, the way in which it was found in the Secondary Cache is written into the block's Data Cache tag way field 787. This information is used if the block is written back to Secondary Cache.

Upgrade Share (101, "US"): This cache contains a shared block, but it has requested that it be upgraded to dirty-exclusive. It is waiting for the external interface to do an invalidate.

Upgrade Clean (110, "UC"): This cache contains a clean exclusive block, but it has requested that it be upgraded to dirty-exclusive. IT is waiting for the external interface to mark the secondary cache block as "dirty".

Refill Dirty ("RD"): This cache has initiated a refill to load this block of the cache and is waiting for the data to be returned. This refill was initiated by a store instruction, so the block's state will be "Dirty Exclusive".

LRU field 791 indicates which block within each set of the cache was "Least Recently Used". When it is necessary to replace one of two old blocks, the LRU block is selected because it is statistically less likely to be used next. This bit is used only when the processor initiates a cache refill, and both blocks in the selected cache set are valid and not locked. (An LRU cache replacement algorithm usually reduces the number of misses a few percent less than a random replacement algorithm, although it is not necessarily the best algorithm for all programs.)

The tag array contains one LRU bit per set of the cache (i.e. per two blocks). Whenever the processor gets a hit on a block in the cache, this bit is updated to select the other block in this set. That is, this block has been used more recently than the other block. When there is a miss, and a new block is refilled into the cache, this bit is updated to select the other block.

Conventionally, the W bit is located in the data array, not the tag array. As discussed above, the W bit is read whenever data is removed from the data cache, such as cache refills, external interrogates or cache invalidates.

These operations require allocation of the tag array as well as checking the W bit. Consequently, both the tag array and data array must be allocated.

However, by locating the W bit in the tag arrays any operation which removes data from the data array needs to access only the tag array. This allows the data array to be allocated to another execution unit simultaneously, thus improving the performance of the microprocessor.

LRU improves the performance of microprocessor by statically increasing the cache's hit rate. Thus, it is a performance feature only; it is not architecturally defined. Tag check cycles, which can result in hits or misses, can occur out of sequence, and they can occur speculatively. As such, the LRU bit is not guaranteed to exactly match the data references of the program.

The LRU bit is fabricated using a special dual-port RAM cell. The second port is used to update the LRU bit during phase 2 of any processor tag check cycle, if there was a cache hit. The extra port requires two extra transistors than the standard 6-transistor cache cell.

The LRU bit can be read along with the rest of the tag. The LRU bit is written only using the second port, when the tag is written during phase 2.

The 3-bit modifier field modifies the meaning of a block's 2-bit state. These bits are separate from the state field, because they are implemented with special dual-port memory cells, similar to the LRU bit. This field may be written during phase 2 of a tag check cycle, depending on whether there was a cache hit.

There are twelve modifier cells per row, which store the 3-bit modifier for each of the four blocks in each row. There are three sense amplifiers. These bits are read when the external interface snoops the primary data cache.

Bit 2 of the state modifier is a "refill" bit. It Indicates that the processor has issued a request for a refill or an upgrade to the External Interface. Only the processor sets it. It is written (along with the rest of the tag) during the next cycle after the processor issues a refill command. Or it can be set by modifying only the state modifier field during phase 2.

Bit 1 of the state modifier is a "written" bit ("W") for each block. This bit indicates that data has been written into the primary data cache and that it is inconsistent with the Secondary Cache. The external interface reads this bit whenever a block is removed from the cache in order to determine if it must be written back to the Secondary Cache. When a block is refilled into the cache, this bit is initially '0' for a load instruction or '1' for a store instruction. It may also be set later, whenever a store instruction uses this block.

Bit 0 is set whenever neither of refill or written bits is set. This bit serves as an odd parity check on the state modifier field. Each valid state has exactly one "1" bit set.

The three bits encode three states. Because each code has one bit set, it effectively implements odd parity. A parity error is signalled if any other pattern is read.

2. Tag Array Control Logic

Address queue performs "tag check" cycles to determine if the Data Cache contains the data it requires. External Interface performs tag check cycles when it invalidates secondary cache blocks.

Figure 11B:
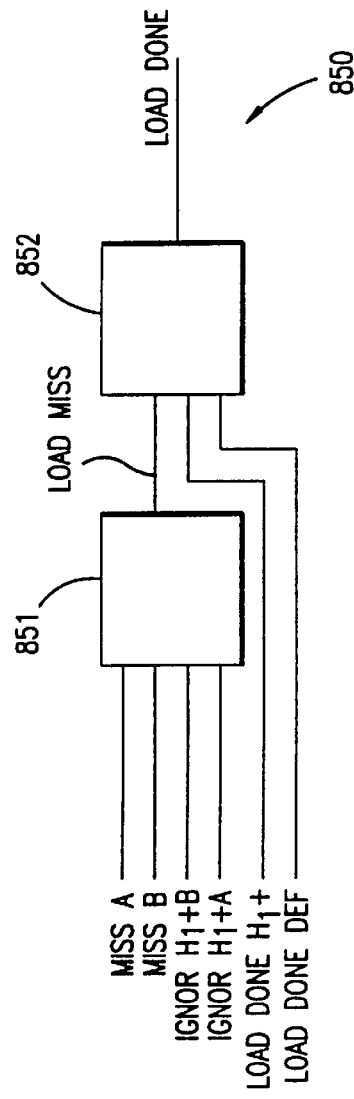
FIGS. 11A–11B disclose the tag check logic.
Figure 11A:
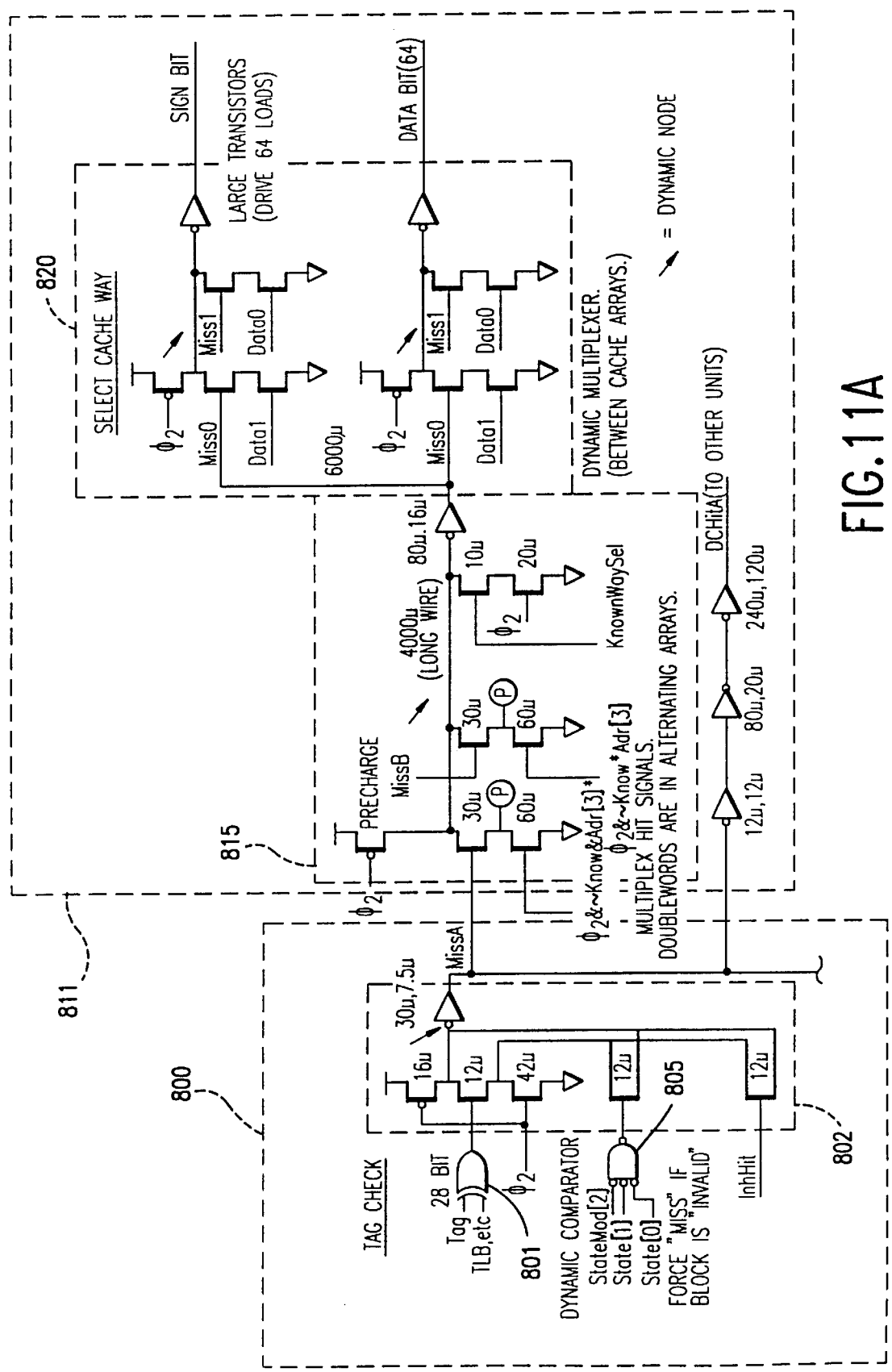

FIG. 11A illustrates one embodiment of the tag check circuit. The desired address to two 28-bit address tags (physical address bits 39:12) are each compared to its corresponding tag bit in an exclusive-or gate 801. For sake of simplicity, only one gate is illustrated, but it will be apparent to those skilled in the art that there is one gate per bit. If any bit position differs, the output of gate 801 is a logic "0" indicating a "cache miss". The exclusive-or gates' outputs are combined in a 28-input dynamic "or" gate 802, using the rising edge of $\phi_2$. The dynamic "or" is much faster than a static gate, but it depends on the timing and skew of the clock. The dynamic "match" node 803 is precharged high during $\phi_1$. It is discharged during $\phi_2$ if any address bit does not match. Thus, the signal remains high for a "hit"; a "miss" results in a falling edge shortly after $\phi_2$ begins. Output of the dynamic or gate is inverted by an inverter 803, whose output is a pulse which rises about 2.5 gate-delays after $\phi_2$ begins when there is a "miss". Otherwise, its output remains zero. This clean output signal allows subsequent logic to be optimized for a single edge transition. It also minimizes noise on 64-bit buses which are distributed long distances.

An extra input to the comparator 805 forces a "miss" if the block's state is "invalid". (The block is invalid if the tags state DCOState[1:01] is "00" and the block is not in "refill" (DCOMod[2]=0). High-speed dynamic comparator 805 naturally generates a pulse for a "cache miss", because it implements logical "or" gates, which have transistors in parallel. A dynamic node is precharged high. This node is pulled low, and an output pulse is generated, if any input bit mismatches. The leading edge of this pulse can be used for switching dynamic or biased logic. However, there is no edge for a "hit".

Way check logic 811 determines which way of the cache contains the desired data during the tag check cycle. If either data array is being read simultaneously for a load instruction, the tag check selects between its two ways. Otherwise, the "way" is stored in the address queue until the instruction is retried.

The cache "miss" pulses (MissA, MissB) correspond to the two ways of the Data Cache. However, as previously discussed, these ways do not correspond with the data arrays.

Within each cache block, double words alternate between arrays. For even doublewords (Adr[3]=0), way 0 is in array 0, and way 1 is in array 1. For odd doublewords (Adr[3]=1), way 0 is in array 1, and way 1 is in array 0. Consequently the miss signals is interchanged when Adr[3]=1 using two dynamic 3-to-1 multiplexers (Miss0, Miss 1). For convenience, only one multiplexer 815 is shown. Multiplexer 815 selects between MissA and MissB. The multiplexer's third input is used when the way is already known. This circuit is precharged during ø1. All inputs are gated with $ø_2$.

The cache "miss" pulses are used to select a dynamic data multiplexer 820. This circuit is actually an "and-or" gate. If there is a miss on way 0, data for way 1 is selected. If there is a miss on way 1, data for way 0 is selected. Thus, if both ways miss, the data bits for both ways are logically or-ed, but this result is not used. (The comparators generate an edge only for a "miss", not for a "hit". This is a nuisance, but it causes no problems with the dynamic multiplexer. However, if a pass-gate multiplexer is used, turning on both inputs will create significant noise.) This means that each "miss" signal can be optimized for speed; there is no race condition.

The miss multiplexer drives a long wire and a large buffer. To switch low quickly, it uses n-channel transistors for the "miss" signals. The "known" input can use a smaller transistor because it switches earlier. The final "miss" buffers drives 64 transistors and about 6000 $\mu$ of wire along the spine of the Data Cache.

Referring to FIG. 11B, logic circuit 850 provides a "load is done" signal (LoadDone) to the instruction queues and Busy Bit Table. This signal, which is derived from outputs of the tag check circuit, may be generated during any cycle when the processor successfully completes a "load" instruction. During tag check cycles, it indicates that the cache contains the addressed data and that no dependencies prevent its use. During refill cycles, it indicates that the Secondary Cache contains the address data and that no ECC error was detected. During "Just Load" cycles, which read only the data array, LoadDone is always asserted. LoadDone is a critical path signal. For speed, it is partially implemented using dynamic logic, which is driven from the hit signals and state bits of the primary cache. Logic circuit 850 is physically adjacent to the tag hit comparator to avoid delay associated with buffering the hit signals.

As shown LoadDone signal is generated in two circuit stages 851 and 852. Circuit stage 851 generates a LoadMiss in response to IgnoreHitB, IgnoreHitA, Miss A, Miss B.

The "Load Miss" signal indicates that neither way of the cache generated a qualified "hit" signal. The outputs of the tag comparators (HitA and HitB) must be gated, however. The address queue inhibits cache hits on either or both ways of the cache, if it detects dependencies between blocks. Cache hits must also be ignored if the block is still being refilled. In this case, the addresses match and the tag comparator generates a "hit", but the data is not yet available. For a refill, tag modifier bit 2 is set, and the tag state is either 00 (refill clean) or 11 (refill dirty). (Tag modifier bit 2 is also set when a block is upgraded for a store operation. The tag state is either 01 or 10. The cache data is valid in the cache and can be used for a load.)

Circuit stage 852 derives the LoadDone signal from LoadMiss and two control signals sent by the address queue, LoadDoneDef, and LoadDoneHit. LoadDoneDef indicates that the load is "done" regardless of the cache hit signals and LoadDoneHit indicates that a load is "done" if there is a cache hit. Table V shows the logical equations for LoadDone signal.

TABLE V

| Signal Name | Description |
|---|---|
| ~LoadMiss = HitA & ~IgnoreHitA \| HitB & ~IgnoreHitB | Hit on way 0 and block is not in refill state. Hit on way 1 and block is not in refill state. |
| IgnoreHitA = InhHit0 \| TagModA[2] & (TagStA=0\|TagStA=3) | Dependency in Address Queue inhibits "hit" on block 0. Block 0 is in refill state. (Upgrade state is okay.) |
| IgnoreHitB = InhHit1 \| TagModB[2] & (TagStB=0 \| TagStB=3) | Dependency in Address Queue inhibits "hit" on block 1. Block 1 is in refill state. (Upgrade state is okay.) |
| LoadDone = LoadDoneDef \| LoadDoneHit & ~LoadMiss | Queue generates "done" regardless of cache "hit". Load is "done" only if the cache "hits". |
| ~LoadDone = | Load is not done if: Miss on both ways. |
| ~LoadDoneDef & MissA & MissB \| ~LoadDoneDef & MissA & IgnoreRitB \| ~LoadDoneDef & MissB & IgnoreHitA \| ~LoadDoneDef & ~LoadDoneTent | Miss on way 0, and block in 1 hits must be ignored. Miss on way 1, and block in way 0 hits must be ignored. Address Queue does not enable done. |

Circuit stages 851 and 852 may be implemented with a 4×3 dynamic "and-or" gate. The circuit's critical path inputs are the "miss" pulses from the tag comparators. These are complements of the "hit" signals, so this equation is complemented. (A fifth term IgnoreHitA&IgnoreHitB has been omitted. It is redundant because the cache cannot properly generate a hit on both ways simultaneously).

This output signal is a pulse during phase 2. It is buffered to drive long wires. Its leading edge is optimized for speed by ratioing the transistors of its output buffer.

Figure 12:
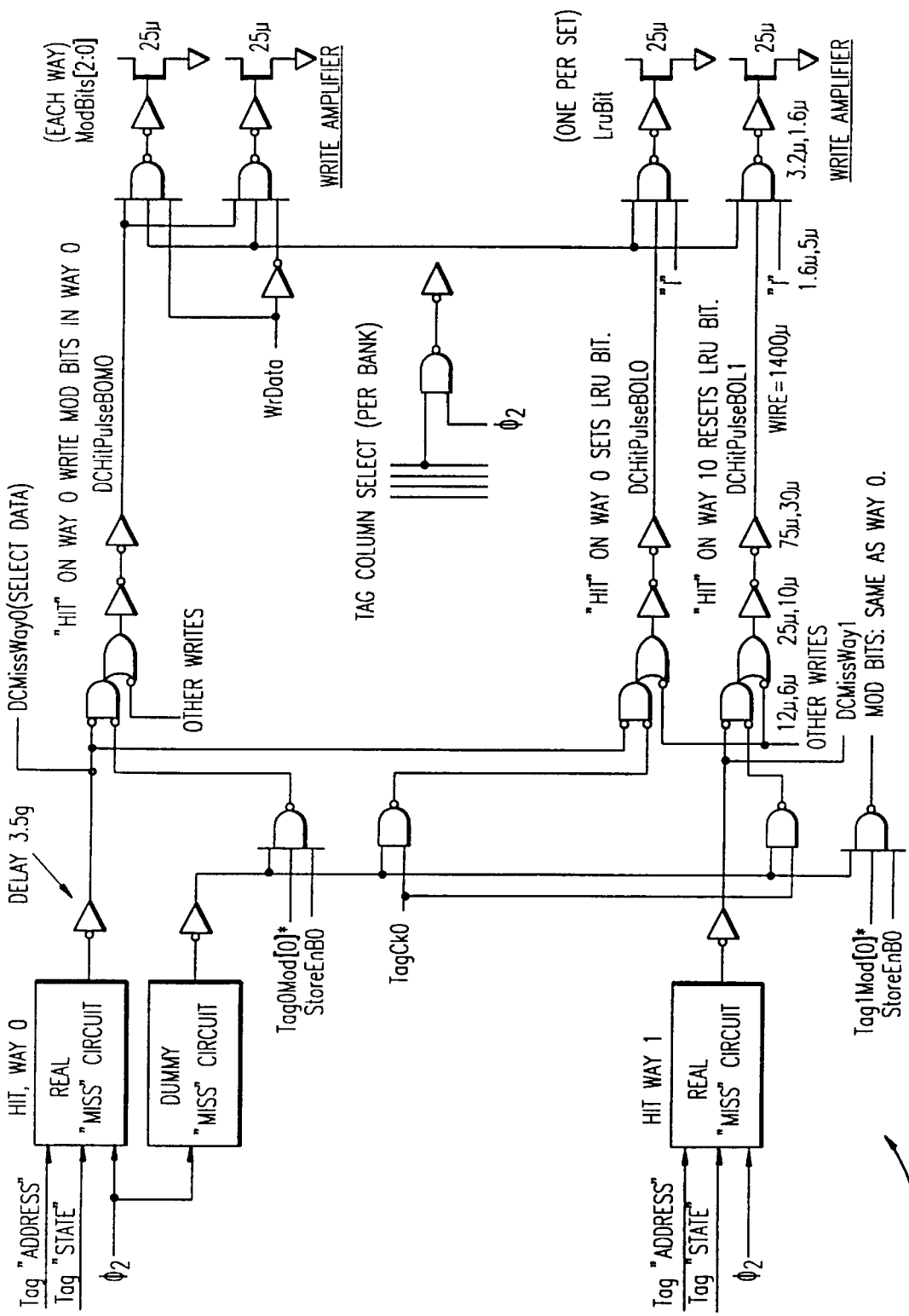
FIG. 12 discloses a logic diagram for generating a cache hit pulse.

FIG. 12 illustrates a circuit 870 which provides pulses to the LRU and tag modifier circuits for each "cache hit". Circuit inverts the "miss" signal and gates it with a timing pulse. To avoid glitches, the timing pulse should start after the "miss" signal has switched. The speed of that signal depends on how many bits differ because each different bit turns on one of the parallel transistors. Switching is slowest when only one bit differs. The timing pulse is generated using a dummy comparator circuit, which simulates timing for a single bit difference. Its output is gated with an enable and TagMod[2]*, which inhibits a "hit" if the block is being refilled. The delay through this gate provides timing margin which eliminates any switching glitches.

Figure 13:
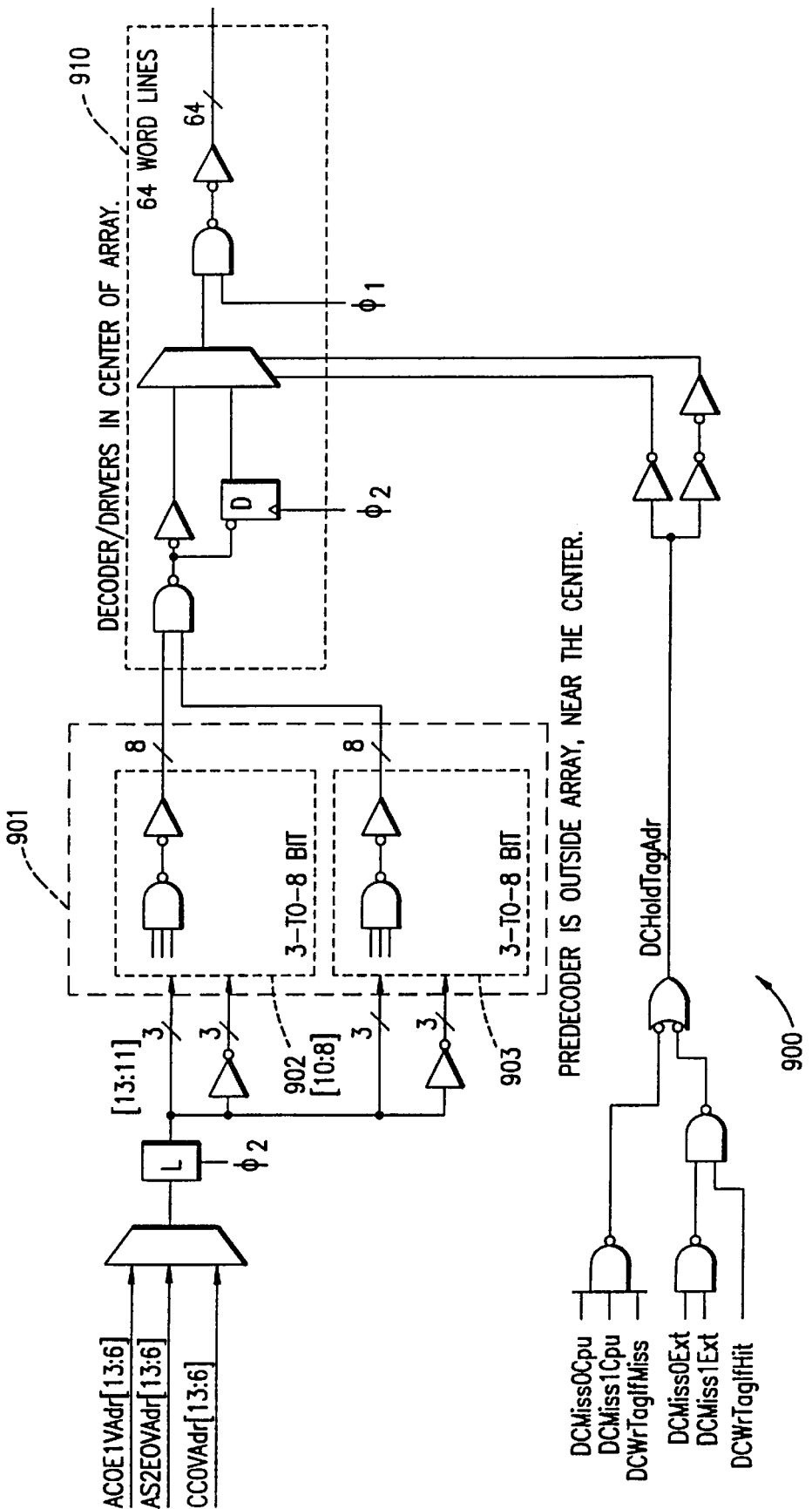
FIG. 13 discloses a block diagram of the row decoder for the cache tag array.

FIG. 13 shows tag row decoder 900 which is a 6-bit to 64-bit row decoder which selects which word line will be asserted. The decoder's input is selected from the addresses provided by the Address Calculation unit, address stack, or external interface. The address is latched at the end of phase 2, so that it will be stable while the word line is driven during the following phase 1.

Decoding is split into predecode and drivers. In the predecoder 901, the high 3 bits (13:11) and low 3 bits (10:8) are separately decoded by 3-to-8 decoders 902 and 903, respectively. Each predecoder has one output high. Low decoder 903 can force all its outputs low to disable the tag array, thereby eliminating most power dissipation in the tag array. These decoders are next to the array at the center. The outputs drive signals across the array to the row decoders. Each output drives 8 loads, which may be distributed across the tag array.

There are 64 word line drivers 910 in each array. One driver is selected by logically and-ing one input from predecoder 901. The output of the "and" gate should be stable by the end of each cycle. It is gated with ø$_1$ to generate a pulse during the first half of the next cycle.

The predecoders have special circuitry to latch their output for use during the next cycle. The outputs are latched accessing the tag before it is updated. The processor does not modify a tag while it is in the "refill" state.

Thus, the external interface can simply write a block's new state at the end of each refill operation. It does not need to do an atomic operation here. State changes for the Data Cache Tags are listed in Table VI.

TABLE VI

| | | | | | | | |
|---|---|---|---|---|---|---|---|
| | | | | Data Cache Refill Way | | | |
| Oper | Old State | Old Mod | Condition | New State | New Mod | Update Cycle | Description |
| CPU tagck | (input) | (input) | (input) | (dec) | (dec) | | (CPU does tag check cycles.) |
| load/store | xx | 001 | Cache miss. Busy=0x. | 00 | 100 | next | Write new tag during next cycle. |
| load, store | xx | 010 | Cache miss. Busy=00. | 00 11 | 100 100 | next | Must also schedule write-back to secondary. (State 3 indicates block will be writable.) |
| store | 01 | 001 | Cache hit. Busy=0x. | xx | 100 | this φ2 | Upgrade "shared" to "dirty exclusive" |
| store | 10 | 001 | Cache hit. Busy=0x. | xx | 100 | this φ2 | Upgrade "clean" to "dirty exclusive" |
| store | 11 | 001 | Cache hit. | xx | 100 | this φ2 | Set "W-bit": inconsistent with secondary. |
| Ext.Int. (inputs) | (Info only) | (Info only) | (inputs) | from Ext.Int | from ExtInt | | (Ext.Int always provides the new state and modifier bits. old state and modifier bits are shown only for reference, but they are not decoded.) |
| DCmd=3 | — | — | | nn | nnn | this | |
| DCmd=5 | — | 100 | | 01 | 001 | this | |
| DCmd=5 | — | 100 | | 10 | 001 | this | |
| DCmd=5 | — | 100 | | 11 | 010 | this | |
| DCmd=8 | — | — | Cache hit. | 00 | 001 | next | |
| DCmd=9 | — | — | Cache hit. | 01 | 001 | next | |
| DCmd=11 | 01 | 001 | Cache hit. | 11 | 001 | next | Mark entry "dirty exclusive" on next cycle in response to earlier "upgrade". Set "inconsistent" if previously in "upgrade" state. Do not change state if normal refill. |
| | 10 | 001 | | 11 | 001 | | |
| | 11 | 001 | | xx | xxx | | |
| | 00 | 100 | | xx | xxx | | |
| | 01 | 100 | | 11 | 010 | | |
| | 10 | 100 | | 11 | 010 | | |
| | 11 | 100 | | xx | xxx | | | during phase 1, while the word line is being driven. This latched output can be selected in place of the new input, during phase 2. This selection is done on the output of the predecoders because the select signal occurs too late. (If the latched decode is used, the latch will be transparent during the next phase 1, with its inputs tied to its outputs. This is stable because these signals will be equal.)

The select signal is based on the cache hit signals. For a tag check by the processor, the tags are written with a new address following a cache miss. For an interrogate by the external interface, the tags are written with a new state, following a cache hit. Otherwise, the decoder selects a new location.

The tag state is changed both by the processor and the external interface. The processor writes a new tag address and state during the cycle after it initiates refilling a cache block. Its state is initially "Refilling" because the data has not yet been loaded. The external interface updates this state when the refill has been completed. It must also check the Data Cache contents when secondary blocks are replaced or in response to an external intervention.

Tag writes must be coordinated between the processor and external interface in order to prevent interference in case both units modify the same block. This is simplified by making most state changes "atomically". That is, whenever either unit decides to change a tag's state, it must modify that tag on the next cycle. This prevents any other operation from The top part of Table VI shows processor operations. The old state and modifier bits (and the cache hit, external interface "busy" signals, and processor refill enables) are decoded to determine the new state and modifier bits. The low part shows External Interface operations. The old state and modifier bits are not decoded, but the cache hit signal is used for "Mark" operations. The new state and modifier bits are provided by the External Interface.

Atomic tag operations require two cycles. The first cycle reads the tag and does a tag check. The second cycle conditionally writes a new value into the tag. Usually only the first cycle is required. For example, the Data Cache typically has a 96% hit ratio, so the processor's second cycle is required only 4% of the time. To avoid wasting cache bandwidth, only the first cycle is allocated. Other processor operations can be scheduled during the second cycle. If the second cycle is needed, it may collide with this other operation. That operation is aborted and retried several cycles later. The external interface cannot retry operations. It does not schedule other operations after its own check cycles. The processor delays any refill operation, if the external interface has requested use of the next cycle.

Each cache bank has separate write enables for its tags. The processor writes both the state and the address sections. The external interface writes only the state. Table VII defines the write enable signal for Bank 0. Bank 1 is similar, except that bit 5 is "1". Writing a tag array is enabled on the previous cycle, if a refill is done or if a tag check requires a write.

TABLE VII

| Signal | Description |
|---|---|
| Bank0TagWrEn=~EX1Index[5]& (EX0DCmdD=5)\| Bank0ModTag; | "Refill Done" Modify tag (read/write cycle pair). |
| Bank0ModTag = Bank0TSeID[1]&WrTg IfMissC & ~DCHitCpu\| EX2Index[5] & WrTag1fHitX & DCHitExt | Processor initiated refill. External interrogate updates tag. |

The processor can initiate a data cache refill during a tag check, if the cache misses and refill is enabled. Refill is enabled if all of the following conditions are met:

These signals are combined into a signal RefEn.

1. The virtual address selects a "cacheable" attribute ("non-coherent", "exclusive", or "shared").
2. The instruction is not a "Store Conditional". (SC is always used following a "Load Linked" instruction. The LL will refill the cache if necessary. If the addressed block is no longer in the cache when the SC graduates, the SC "fails", and the write is aborted.)
3. The external interface Miss-Handling-Table is not busy. (CCOBusy bit 1.)
4. If a write-back is required, the Secondary Cache's write buffer is not busy. (CCOBusy bit 0.) These signals are combined into separate AvForRef signals for each cache way, as shown in Table VII.)
5. The old cache state modifier is not "refill". (When a cache block is in "refill" state, it must wait for the external interface to complete before any new operation can be initiated for that block.)
6. The address queue enables refills, indicating that the way of the cache is available. (AQOWavO:1Av).

A way is not available for refill if it is already flagged as "locked" or "used" in the queue. This indicates that another entry needs the existing block, so that it cannot be replaced. If the current instruction has any cache dependency (DepRowC), either flag will make both ways unavailable because one way must be reserved for the oldest instruction.

A way is also not available for refill if the external interface will use the tag array of the same cache bank during the following cycle. Because the tag check is in cycle "C2", this interlock checks the "cycle C2" usage bits (ExtUseCD).

Whenever a block is refilled into the Data Cache, tag logic determines which way of the cache will be replaced, as shown in Table VIII. If either way is "invalid", a new block can be loaded without invalidating any previous block. Specifically, if block 0 is invalid, it is replaced. Otherwise, if block 1 is invalid, it is replaced.

TABLE VIII

Data Cache Refill Way

| Refill Enable | AvForRef B,A | Valid B,A | LRU | Select Way to Replace | Description |
|---|---|---|---|---|---|
| 0 | xx | xx | x | no refill | Refill is not enabled. |
| 1 | 00 | xx | x | no refill | Refill is not allowed for aset if neither block is available. |
| 1 | 01 | xx | x | refill 0 | Replace Way 0 if it is available and Way 1 is not. |

TABLE VIII-continued

Data Cache Refill Way

| Refill Enable | AvForRef B,A | Valid B,A | LRU | Select Way to Replace | Description |
|---|---|---|---|---|---|
| 1 | 10 | xx | x | refill 1 | Replace Way 1 if it is available and Way 0 is not. (Unavailable if already in "Refill", or if "Locked" or "Use" in AQ.) |
| 1 | 11 | x0 | x | refill 0 | If Way 0 contains an "Invalid" block, refill Way 0. |
| 1 | 11 | 01 | x | refill 1 | Else, if Way 1 contains an "Invalid" block, refill Way 0. |
| 1 | 11 | 11 | 0 | refill 0 | Way 0 is "Least Recently Used" |
| 1 | 11 | 11 | 1 | refill 1 | Way 1 is "Least Recently Used" |

If both blocks are valid, the cache must replace a valid block. However, these blocks may not be available for replacement. The cache must keep blocks which are in "Refill" tag state or are "Locked" or "Used" in the address queue. If a block is in a "Refill" state, it cannot be refilled again until the first refill has been completed. If neither block is available, a new refill cannot be initiated. If only one block is available, it is replaced. If both are available, the "Least Recently Used" way is refilled. (See next subsection.)

The RefEn and AvForRef[1:O] signals are described in Subsection 16.3.8. A tag is "valid" if its state is not zero or if its state modifier is "refill". The LRU is read from the cache tag array.

This table generates two signals. DCBeginRef indicates that a refill operation has been initiated. DCRefWay indicates which way of the cache will be refilled.

D. Cache Interface

The Data Cache interfaces to the processor's load/store and to the external interface. The external interface the processor and Data Cache a 4-bit "command" code, indicating which operation it is performing. These commands are listed in Table IV.

TABLE IV

External Commands to Data Cache (EXODCmd[3:0].)

| Code | Mnemonic | Description |
|---|---|---|
| 0 | Idle | Idle. No operation begun during this cycle. |
| 1 | Uncached Load | Data response from an uncached load instruction. |
| 2 | Read Tag | Write tag array for CACHE operation. (All fields: State, W-bit, LRU, Tag address). Contents of Tag are loaded into the TagHi and TagLo registers. |
| 3 | Write Tag | Write tag array for CACHE operation. (All fields: State, W-bit, LRU, Tag address). Tag is written from contents of the TagHi and TagLo registers. |
| 4 | Refill | Refill data for first quadword of a block into the Data Cache. |
| 5 | Refill Done | Refill data for second quadword into the Data Cache. Change the cache line state from "refilling" to equal the secondary cache state, and "consistent" for load instructions or "inconsistent" for store instructions. This command is also used as the "successful" response to an invalidate request. |
| 6 | Data Read | Read data from the Data Cache. (128-bit quadword.) |

TABLE IV-continued

External Commands to Data Cache
(EXODCmd[3:0].)

| Code | Mnemonic | Description |
|------|----------|-------------|
| 7 | Write Tag State | First, read state to determine if write-back is required. The write " state" and "modifier" bits of tag array (to "invalid"), regardless of cache "hit". |
| 8 | Mark Invalid | Interrogate the Data Cache tags. If the specified block is present, change its tag to "Invalid" during the next cycle. If it was inconsistent, initiate a write-back operation. (The external interface's write buffer must not be busy during this cycle.) |
| 9 | Mark Shared | Interrogate the Data Cache tags. If the specified block is present, change its tag to "Shared" during the next cycle. |
| 10 | (unused) | |
| 11 | Mark Dirty | Interrogate the Data Cache tags. If the specified block is present, change its tag to "Dirty Exclusive" and "inconsistent" during the next cycle. |
| 12 | Nack on Uncached Load | The system interface detected a "cancel" acknowledge on a cache refill operation. The processor will retry this operation (except for prefetch). |
| 13 | Nack on Cached Access | The system interface detected an error on an uncached load operation. This operation was aborted. The processor will take an exception on this operation. |
| 14 | Bus Error on Uncached Load | The system interface detected an error on an uncached load operation. This operation was aborted. The processor will take an exception on this operation. |
| 15 | Bus Error on Cached Access | The system interface detected an error on a cache refill. This operation was aborted. The processor will take an exception on this operation (except for prefetch). |

The External Interface sends this command, a new state code, state modifier, an index address, a tag address, two cycles before the actual cache operation. The cache and the address queue each pipeline these fields for use during the next two cycle.

For each external command, Table X lists the operations performed in the Data Cache's data array, tag array, and in the address queue. The address queue decodes this code to determine which sections of the cache are needed by the External Interface.

TABLE X

External Commands to Data Cache, cont.

| ExtCmd[3:0] | Data Array | Tag Array | Address Queue (if block 1 match) |
|---|---|---|---|
| 0 Idle | | | |
| 1 Uncached Load | | | Graduate load (no match required.) |
| 2 Read Tag | | Read/State/W/LRU/Tag | |
| 3 Write Tag | | Write State/W/LRU/Tag | |
| 4 Refill | Write 128 bits | | Reset refill and enable freeload if quadwordword match. |
| 5 Refill Done | Write 128 bits | Write W, state = (N,S,C,D). ("N" indicates ECC error.) | Reset refill and enable freeload if quadword match. |
| 6 Data Read | Read 128 bits | | |
| 7 Write Tag State | | 1: Read state. 2: Write state&modifier field. | |
| 8 Mark Invalid | | Read and check tag. If hit, write state & modifier fields. | Reset "hit" status if cache hit. Set soft exception if load is "done" but not graduated. Way selected by hit. |
| 9 Mark Shared | | Read and check tag. If hit, set state to "shared" next cycle. | Reset "hit" status if entry contains a store instruction if cache hit. Way selected by hit. |
| 10 unused | | | |
| 11 Mark Dirty | | Read and check tag. If hit, write state and modifier bits to "dirty inconsistent" on next cycle. | Reset "upgrade" status bit if cache hit. Way selected by hit. |
| 12 Nack on Uncached Load | | | Abort, then retry operation. |
| 13 Nack on Cached Address | | Write state = "N" (Refill was not completed) | Abort, then retry operation (except prefetch). Use way from ExtInt. Set exception code = "bus error" |
| 14 Bus Error on Uncached Load | | | |
| 15 Bus Error on Cached Address | | Write state = "N" (Refill was not completed) | Set exception code = "bus error" Use way from ExtInt. |

If the External Interface sends a "MarkInvalid" or "Mark-Shared" command, it does not send commands to the same bank's tag array on the following cycle. These operations perform read/modify/write operations.

The external interface sends the processor a "busy" signal which indicates when it can accept new operations. Bits 1 indicates if the Miss Handling Table is busy. If it is set the External Interface cannot accept any new command. Bits 0 indicates if the Write-Back Buffer is busy. If it is set, the External Interface cannot accept any refill request for an "inconsistent" block and data is written back to secondary cache.

During cycle "C0", the External Interface sends the address queue a 10-bit "index" address (EX0Index[13:4] and EX0Way), identifying the Data Cache block it will access two cycles later (cycle "C2"). The queue uses an associative compare port to identify any active instruction which is affected by this block.

The Data Cache registers this address for decoding during the next cycle (cycle "C1").

The Data Cache provides address and hit signals to the external interface during tag check cycles.

For Processor Tag Checks: from the tar section of the selected Data Cache bank.)

DC2CpuVAdr[13:0]: The Data Cache multiplexes the "index" bits of the virtual address from the ACU or the address stack during the previous cycle ("C1"). This address is delayed in a register until "C2".

DC2CpuPAdr[39:12]: The Data Cache multiplexes the translated physical addresses from the TLB or the address stack during the tag check cycle.

Five "Write-Back" fields provide address and status for writing a cache block back to secondary cache. If the cache hits, these fields select the "hit" way. Otherwise, if a refill is initiated, they select the way being refilled.

DC2WBTag[22:12]: The tag helps determine where to write the data in the secondary cache, because it uses more index bits than primary cache.

DC2WBState[1:0]:
DC2WBSCWay: Way in the secondary cache.
DC2WBIndex:

For External Interface Tar Checks: (from the tag section of the selected Data Cache bank.)

MDOTag[39:121: This bus is bidirectional.
DC2RdState[1:0]:
DC2RdMod[2:0]:
DC2RdSCWay:

While the above is a complete description of the preferred embodiment of the invention, various modifications, alternatives and equivalents may be used. For example, the cache may be implemented as a n-way set-associative cache. Other variations may include different block sizes and different size address lines. Therefore, the above description should not be taken as limiting the scope of the invention which is defined by the appended claims.

What is claimed is:

1. A cache memory accessed by an address, said cache memory comprising:

a first array of RAM cells containing a first plurality of sets of cells;

a second array of RAM cells containing a second plurality of sets of cells and operating at about the same time as said first array, wherein said RAM cells of said first array are interleaved such that a first cell within a first set of said first plurality of sets corresponds to a first way and each subsequent cell within said first set corresponds to ways alternating between a second way and said first way, and said RAM cells of said second array are interleaved such that a second cell within a second set of said second plurality of sets corresponds to said second way and each subsequent cell within said second set corresponds to ways alternating between said first and second ways, and wherein said first and second sets are each associated with a particular bit position;

a decoder coupled to said first array and said second array for enabling said first and second arrays at about the same time;

a first multiplexer coupled to said first set for outputting selected contents of said first array; and a second multiplexer coupled to said second set for outputting selected contents of said second array at about the same time as said first multiplexer.

2. The cache memory of claim 1 wherein said first and second multiplexers each receive at about the same time contents of arrays associated with both said first way and said second way.

3. The cache memory of claim 1 wherein said first set and said second set include a portion of a first doubleword in said first way and a portion of a first doubleword in said second way, respectively.

4. The cache memory of claim 3 wherein said first set and said second set include a portion of a second doubleword in said second way and a portion of a second doubleword in said first way, respectively.

5. The cache memory of claim 4 wherein said first and second multiplexers output at about the same time said portion of said first doubleword in said first way and said portion of said first doubleword in said second way, respectively, or said portion of said first doubleword in said first way and said portion of said second doubleword in said first way, respectively.

6. The cache memory of claim 5 further comprising an output data line coupled to said first and second multiplexers, said output data line being a single doubleword in width.

7. The cache memory of claim 5 further comprising:
a third multiplexer coupled to said first multiplexer;
a fourth multiplexer coupled to said second multiplexer; and
a CPU register file coupled to said third and fourth multiplexers, wherein said portion of said first doubleword in said first way and said portion of said first doubleword in said second way are directed to said CPU register file through said third and fourth multiplexers, respectively.

8. The cache memory of claim 7 further comprising:
a fifth multiplexer coupled to said first multiplexer;
a sixth multiplexer coupled to said second multiplexer; and
an external interface coupled to said fifth and sixth multiplexers, wherein said portion of said first doubleword in said first way and said portion of said second doubleword in said first way are directed to said external interface through said fifth and sixth multiplexers, respectively.

9. The cache memory of claim 1 wherein said RAM cells of said first array and said second array are interlaced by bit positions such that cells representing bit position 0 within each byte of said first plurality of sets of cells are disposed adjacent to each other.

10. The cache memory of claim 1 further comprising a first sense amplifier having an input and an output, said input being coupled to said first multiplexer and said output being determined exclusively by said first multiplexer.

11. The cache memory of claim 10 further comprising a second sense amplifier having an input and an output, said input being coupled to said second multiplexer and said output being determined exclusively by said second multiplexer.

12. The cache memory of claim 1 further comprising a first sense amplifier coupled to said first multiplexer, said first sense amplifier uncontrolled by said address.

13. A memory comprising:
   a first array of memory cells, wherein said memory cells of said first array are interleaved in an alternating pattern corresponding to first and second ways beginning with said first way;
   a second array of memory cells, wherein said memory cells of said second array are interleaved in an alternating pattern corresponding to first and second ways beginning with said second way;
   a first multiplexer coupled to said first array for outputting select contents of said first array; and
   a second multiplexer coupled to said second array for outputting select contents of said second array at about the same time as said first multiplexer, wherein said first and second multiplexers each receive at about the same time contents of arrays contained within a set of cells, each set associated with a particular bit position and containing cells interleaved between said first way and said second way.

14. The memory of claim 13 further comprising a decoder coupled to said first array and said second array for enabling said first and second arrays at about the same time.

15. The memory of claim 13 further comprising a first sense amplifier coupled to said first multiplexer and a second sense amplifier coupled to said second multiplexer.

16. The memory of claim 13 wherein said select contents of said first array comprise a.portion of a first dataword of said first way, and said select contents of said second array comprise a portion of a second dataword of said first way.

17. The memory of claim 13 wherein select contents of said first array comprise a portion of a first dataword of said first way, and said select contents of said second array comprise a portion of a second dataword of said first way or a portion of a first dataword of said second way.

* * * * *